US008581772B2

(12) United States Patent
Long et al.

(10) Patent No.: US 8,581,772 B2
(45) Date of Patent: Nov. 12, 2013

(54) METHOD, APPARATUS, AND SYSTEM TO REMOTELY ACQUIRE INFORMATION FROM VOLUMES IN A SNOWPACK

(75) Inventors: David G. Long, Provo, UT (US); Stephen Joseph Preston, Murray, UT (US)

(73) Assignee: Brigham Young University, Provo, UT (US)

( * ) Notice: Subject to any disclaimer, the term of this patent is extended or adjusted under 35 U.S.C. 154(b) by 216 days.

(21) Appl. No.: 13/149,881

(22) Filed: May 31, 2011

(65) Prior Publication Data

US 2011/0298647 A1 Dec. 8, 2011

Related U.S. Application Data

(60) Provisional application No. 61/396,920, filed on Jun. 4, 2010.

(51) Int. Cl.
*G01S 13/00* (2006.01)
(52) U.S. Cl.
USPC .......................... 342/22; 342/25 R; 342/25 A
(58) Field of Classification Search
USPC .......... 342/22, 25 R, 25 A, 25 B, 25 C, 25 D, 342/25 E, 25 F
See application file for complete search history.

(56) References Cited

U.S. PATENT DOCUMENTS

| 3,665,466 A | * | 5/1972 | Hibbard | 342/59 |
| 3,806,795 A | * | 4/1974 | Morey | 324/337 |
| 4,008,469 A | * | 2/1977 | Chapman | 342/22 |
| 4,072,942 A | * | 2/1978 | Alongi | 342/22 |
| 4,075,555 A | * | 2/1978 | Wight et al. | 324/644 |
| 4,184,155 A | * | 1/1980 | Sivertson, Jr. | 342/6 |
| 4,314,240 A | * | 2/1982 | Schnug | 340/573.4 |
| 4,321,601 A | * | 3/1982 | Richman | 342/25 C |
| 4,331,957 A | * | 5/1982 | Enander et al. | 342/22 |

(Continued)

FOREIGN PATENT DOCUMENTS

WO    WO 2008119455 A1 * 10/2008

OTHER PUBLICATIONS

"Dielectric Properties of Snow", W.H. Stiles, Ulaby, F.T. Remote Sensing Laboratory University of Kansas Center for Research Inc, Lawrence, Kansas 66045, 1980, pp. 91-103. Retrieved on Jun. 24, 2013 from http://www.dtic.mil/cgi-bin/GetTRDoc?Location=U2&doc=GetTRDoc.pdf&AD=ADP000148.*

(Continued)

*Primary Examiner* — Jack W Keith
*Assistant Examiner* — Peter Bythrow
(74) *Attorney, Agent, or Firm* — Stephen Preston Law LLC; Stephen J. Preston

(57) ABSTRACT

A method, apparatus, and system to remotely acquire information from volumes in a snowpack and to analyze the information are disclosed. Electromagnetic energy is transmitted remotely to a region of interest in a snowpack and data about reflections are processed to determine reflection values for different volumes within the snowpack. The frequency of the transmit signal is modulated and the positions from which energy is transmitted and received are changed to create a two-dimensional synthetic aperture that allows reflections from three-dimensional volumes to be discriminated and resolved. The electromagnetic energy is transmitted to ensure that it arrives at the snowpack at shallow grazing angles to maximize returns from volumes in the snow and to minimize boundary reflections from the ground.

20 Claims, 17 Drawing Sheets

(56) References Cited

U.S. PATENT DOCUMENTS

| | | | |
|---|---|---|---|
| 4,495,500 A * | 1/1985 | Vickers | 342/59 |
| 4,698,634 A * | 10/1987 | Alongi et al. | 342/22 |
| 4,866,446 A * | 9/1989 | Hellsten | 342/25 A |
| 4,958,638 A * | 9/1990 | Sharpe et al. | 600/407 |
| 4,965,582 A * | 10/1990 | Hellsten | 342/25 A |
| 5,172,110 A * | 12/1992 | Tiefengraber | 340/8.1 |
| 5,307,272 A * | 4/1994 | Butler et al. | 700/90 |
| 5,400,030 A * | 3/1995 | Duren et al. | 342/22 |
| 5,420,589 A * | 5/1995 | Wells et al. | 342/22 |
| 5,448,501 A * | 9/1995 | Hablov et al. | 340/573.1 |
| 5,452,639 A * | 9/1995 | Aulenbacher et al. | 89/1.13 |
| 5,530,429 A * | 6/1996 | Hablov et al. | 340/552 |
| 5,594,250 A * | 1/1997 | Condreva | 250/361 R |
| 5,661,464 A * | 8/1997 | Bilak et al. | 340/690 |
| 5,673,050 A * | 9/1997 | Moussally et al. | 342/22 |
| 5,680,048 A * | 10/1997 | Wollny | 324/329 |
| 5,790,032 A * | 8/1998 | Schmidt | 340/573.4 |
| 5,796,363 A * | 8/1998 | Mast | 342/22 |
| 5,869,967 A * | 2/1999 | Straus | 324/326 |
| 5,955,982 A * | 9/1999 | Moulin | 342/22 |
| 6,031,482 A * | 2/2000 | Lemaitre et al. | 342/22 |
| 6,091,354 A * | 7/2000 | Beckner et al. | 342/22 |
| 6,094,157 A * | 7/2000 | Cowdrick | 342/22 |
| 6,188,348 B1 * | 2/2001 | Raney | 342/22 |
| 6,208,286 B1 * | 3/2001 | Rostislavovich et al. | 342/135 |
| 6,216,540 B1 * | 4/2001 | Nelson et al. | 73/633 |
| 6,501,413 B2 * | 12/2002 | Annan et al. | 342/22 |
| 6,567,036 B1 * | 5/2003 | Eckhard | 342/22 |
| 6,590,519 B2 * | 7/2003 | Miceli et al. | 342/22 |
| 6,621,448 B1 * | 9/2003 | Lasky et al. | 342/22 |
| 6,664,914 B2 * | 12/2003 | Longstaff et al. | 342/22 |
| 6,690,316 B2 * | 2/2004 | Yankielun | 342/22 |
| 6,894,637 B2 * | 5/2005 | Moreira et al. | 342/22 |
| 6,982,666 B2 * | 1/2006 | Temes et al. | 342/22 |
| 7,040,146 B2 * | 5/2006 | Mackenzie et al. | 73/81 |
| 7,095,359 B2 * | 8/2006 | Matsuoka et al. | 342/26 R |
| 7,158,071 B2 * | 1/2007 | Testud et al. | 342/25 R |
| 7,262,602 B2 * | 8/2007 | Meyer | 324/337 |
| 7,528,762 B2 * | 5/2009 | Cerwin | 342/22 |
| 7,659,847 B2 * | 2/2010 | Bausov et al. | 342/22 |
| 7,893,862 B2 * | 2/2011 | Holly et al. | 342/22 |
| 8,159,384 B2 * | 4/2012 | Scheiber | 342/25 F |
| 2003/0020647 A1 * | 1/2003 | Yankielun | 342/22 |
| 2003/0117321 A1 * | 6/2003 | Furse et al. | 343/700 MS |
| 2003/0189511 A1 * | 10/2003 | Lasky et al. | 342/22 |
| 2005/0062639 A1 * | 3/2005 | Biggs | 342/22 |
| 2005/0076709 A1 * | 4/2005 | Mackenzie et al. | 73/81 |
| 2006/0061504 A1 * | 3/2006 | Leach et al. | 342/22 |
| 2006/0170584 A1 * | 8/2006 | Romero et al. | 342/22 |
| 2007/0152866 A1 * | 7/2007 | Nelson | 342/22 |
| 2007/0176826 A1 * | 8/2007 | Daniele et al. | 342/465 |
| 2008/0164407 A1 * | 7/2008 | Choquette et al. | 250/262 |
| 2008/0218170 A1 * | 9/2008 | Stolarczyk et al. | 324/330 |
| 2008/0246647 A1 * | 10/2008 | Hellsten | 342/22 |
| 2009/0040093 A1 * | 2/2009 | Holly et al. | 342/22 |
| 2009/0167589 A1 * | 7/2009 | Bausov | 342/22 |
| 2010/0045513 A1 * | 2/2010 | Pett et al. | 342/25 C |
| 2010/0052970 A1 * | 3/2010 | Moussally et al. | 342/22 |
| 2012/0133543 A1 * | 5/2012 | Al-Khalefah et al. | 342/22 |
| 2012/0229321 A1 * | 9/2012 | Holly et al. | 342/22 |

OTHER PUBLICATIONS

Ground-based frequency-modulated continuous wave radar measurements in wet and dry snowpacks, Colorado, USA: an analysis and summary of the Mar. 2002 NASA CLPX data Hans-Peter Marshall, Gary Koh, Richard R. Forster, Article first published online: Dec. 13, 2004, DOI: 10.1022/hyp.5894.*

"FMCW radars for snow research," Cold Regions Science and Technology, vol. 52, pp. 118-132, Feb. 2008, 53.*

Marshall, et al; "Snow stratigraphy measurements with high-frequency FMCW radar: Comparison with snow micro-penetrometer," *Cold Regions Science and Technology*, vol. 47, pp. 108-117, 2007. 1, 2, 37, 40, 41, 42, 151, 161, 177.

Ellerbruch, et al; "Microwave characteristics of snow," in *Proceedings of the 45th Annual Western Snow Conference*, Albuquerque, NM, Apr. 1977, pp. 630-677.2.

Boyne et al; "Microwave measurements of snow stratigraphyand water equivalence," in *Proceedings of the 47th Annual Western Snow Conference*, Sparks, NV, Apr. 1979, pp. 651-679.2.

Ellerbruch, et al.; "Snow stratigraphy and water equivalence measured with an active microwave system," *Journal of Glaciology*, vol. 26, No. 94, pp. 225-233,1980.2; [5] H.

Gubler, et al.; "Seasonal snow cover monitoring using FMCW radar," in *Proceedings of the International Snow Science Workshop*, Lake Tahoe, CA, Oct. 1986, pp. 87-97. 2.

Fuijino, et al.; "Snow stratigraphy measured by an active microwave system," *Annals of Glaciology*, vol. 6, pp.207-210, 1985. 2.

Marshal, et al.; "CLPX-ground: Ground-based frequency modulated continuous wave (FMCW) radar," National Snow and Ice Data Center, Boulder, CO, 2004, digital media available at http ://nsidc:org// data//docs//daac//insidc0164clpxfmcw/. 2, 147, 148.

Marshall, et al; "FMCW radars for snow research," *Cold Regions Science and Technology*, vol. 52, pp. 118-131,2008. 2, 53.

Demuth, et al.; "High resolution near-surface snow stratigraphy inferred from ground-based 8-18 GHz FMCW radar measurements: Devon Ice Cap, Nunavut, Canada Jun. 2005, cryostat validation experiment," in *Proceedings of the 64th Eastern Snow Conference*, St. Johns, Newfoundland, Canada, May-Jun. 2007, pp. 9-14. 2.

Marshall, et al.; "Helicopter-based microwave radar measurements in alpine terrain," in *Proceedings of the International Snow Science 201; Workshop*, Whistler, British Columbia, Canada, Sep. 2008, pp. 20{26. 2, 3, 37, 40, 41, 151, 161, 177.

Frey et al.; "Tomographic Imagining of a Forested Area by Airborne Multi-Baseline P-Band SAR"; Sensors; May 30, 2008; revised form: Aug. 29, 2008/Accepted: Sep. 18, 2008/Published: Sep. 24, 2008.

Austin, et al.; "Sparse multipass 3D imaging: applications to the GOTCHA data set," in Algorithms for Synthetic Aperture Radar Imagery XVI, Proceedings of SPIE, E. G. Zelnio and F. D. Garber, eds., 7337(02), 2009.

Homer, et al.; "High resolution 3D imaging via multipass SAR." IEE Proc., Radar Sonar Navig. 2002.

sta.jrc.ec.europa.eu/index.php/component/content/article/.../169-three-dimensional-synthetic-aperture-.

* cited by examiner $$fp\_diameter = \frac{\lambda R}{d}$$

$$r = \frac{c}{2B}$$

$$r = \frac{R\lambda}{2D}$$

$$r = \frac{l}{2}$$

| Freq. (GHz) | Band | 50 m Range | 100 m Range | 300 m Range | 500 m Range |
|---|---|---|---|---|---|
| 15 | Ku | 5 m | 10 m | 30 m | 50 m |
| 22.25 | K | 3.37 m | 6.74 m | 20.2 m | 33.71 m |
| 33.75 | Ka | 2.2 m | 4.4 m | 13.3 m | 22.2 m |
| 40 | Ka | 1.87 m | 3.75 m | 11.25 m | 18.75 m |

METHOD, APPARATUS, AND SYSTEM TO REMOTELY ACQUIRE INFORMATION FROM VOLUMES IN A SNOWPACK

CROSS-REFERENCE TO RELATED APPLICATIONS

The present application claims the priority of U.S. Provisional application No. 61/396,920, filed Jun. 4, 2010, the disclosure of which is hereby incorporated by reference herein.

FIELD OF THE INVENTION

This invention relates to approaches to acquiring information from within a snowpack. More particularly, the invention relates to the use of a radar system to remotely acquire information from distinct volumes within a snowpack.

BACKGROUND OF THE INVENTION

The blanket of a snowpack can conceal many different things. For example, a snowpack can conceal the body of an avalanche victim, avalanche debris indicative of the extent and path of an avalanche, layers of weakness that later may become responsible for the formation of an avalanche, and the amount of water contained in the snowpack, among other things. Information about such things can save lives, be helpful in the recovery of human remains, prevent property damage, and provide important information for water-use planning.

Presently, such information is obtained by local investigations of the volume of a snowpack. For example, individuals search for avalanche victims by thrusting probes into the snowpack. Similarly, individuals dig time-consuming snow pits to look for avalanche-prone layers of weakness in a snowpack to predict avalanche danger. Determinations about avalanche flow paths and volumes occupied by avalanche debris are made in similar ways. The snow/water equivalence of a snowpack requires localized and time-consuming measurements about snowpack densities and thicknesses.

These localized investigations and measurements often need to be repeated over large areas to obtain sufficient, or optimal results. For example, the contours for avalanche debris must be determined over several avalanche cycles to assess where structures may safely be built or to determine where to search for an avalanche victim. The stratigraphy of a snowpack, in terms of layers that may contribute to avalanche formation, varies widely over small distances—such as a meter—due to rapidly varying micro-climates in mountainous terrain. A snow pit in a single location, therefore, will often not uncover the weakest portion of a snowpack responsible for the formation of an avalanche in a particular avalanche track. Changes in stratigraphy also have implications for snow/water equivalence, as do changes in snowpack thickness that arise from wind and any number of additional factors, resulting in the need for many measurements.

The time and resources required to make such investigations and measurements are a problem. Where an avalanche victim is involved, every passing minute reduces the probability of finding the victim alive. The investigations and measurements involved in finding an avalanche victim can be so extensive that it is not uncommon to wait for the spring thaw to recover the victim's remains. In terms of avalanche prediction, the number of snow pits required to assess the stratigraphy of a slope in terms of potential for avalanche formation over the region within which an avalanche may form, makes the actual digging of all the snow pits entirely impractical. Educated guesses must be made based on experience, weather, topology, snowpack history, and a wide array of additional factors. The large areas that must be surveyed and the repeated measurements required to assess the flow patterns and regions occupied by avalanche debris also presently require estimations. More objective, less time-consuming, more efficient, and safer methods for acquiring information from volumes in a snowpack over large areas are needed.

The ability of radar to penetrate a snowpack over a large area and to acquire information about varying electromagnetic and geometric properties within the volume of a snowpack that can be correlated to phenomena of interest, makes radar a likely candidate to meet these needs. Prior art demonstrates the ability to harness the impressive range resolution of frequency modulated radar systems to probe a snowpack. Such radar based investigations can be used to discover a body and to reveal properties such as thickness, density, snow-water equivalency, and particular aspects of snowpack stratigraphy by distinguishing between certain layers in the snowpack. The approaches taken in the prior art, however, can only determine the location of reflections from within the snowpack along an axis defined by the direction of propagation, i.e., the range axis.

For a remotely disposed radar system, however, large areas of a snowpack are included within the beam pattern from the radar system. FIG. 1a depicts a system 100 exemplary of this situation in the prior art. In FIG. 1a, a remotely disposed antenna 102 is orientated to transmit toward a snowpack 104 that reposes in mountainous terrain. The remote location of the antenna 102 results in large ranges to locations in the snowpack 104. The footprint 106 illuminated by the antenna 102 becomes larger and larger as range increases according to Equation 1, as provided in FIG. 1b, where '$\lambda$' denotes wavelength, 'R' denotes range, and 'd' denotes the diameter of a circular antenna aperture 102. As appreciated, according to Equation 1, the footprint 106 increases with increasing range. For a particular range, the footprint 106 in FIG. 1a would actually describe an arched shape. However, for simplification of the illustration, the footprint 106 is depicted in a plane normal to the direction of propagation.

The ability to differentiate locations only with respect to the range axis results in ambiguities about the location from which reflections to the radar system originate from within the beam pattern, despite the fine range resolution. As depicted in FIG. 1a, the footprint 106 includes large portions of the snowpack 104. Although the reflections from the same range will not include reflections from the entire snowpack 104, the reflections from large areas of the snowpack 104 will be combined.

Where information about snowpack stratigraphy is sought, changes in the orientation of layers in the snowpack relative to the range axis are particularly problematic for radar systems solely capable of determining locations with respect to the range axis. On the mountainous slopes on which a snowpack reposes, the orientation of a snowpack relative to a remotely disposed radar system can vary widely. FIG. 2 depicts a system 200 exemplifying this additional complication to the situation in the prior art.

In FIG. 2, a remotely disposed radar 202 transmits to a snowpack 204 that reposes in mountainous terrain. The sloping nature of mountainous terrain greatly changes the relative orientation of the range axis 210 from one location to another as seen in the first expanded view 206 and the second expanded view 208. Additionally, mountainous terrain is rugged, and the surface of the bed on which a snowpack reposes undulates and varies widely from location to location.

In the expanded views 206, 208 of the relative orientations of the range axis 210 to the snowpack layers 214a-212d, the hash marks 121a-121f, disposed along the range axis 210, indicate regions that are distinctly resolvable for the radar 202 with its ultra-high-range resolution. However, even with ultra-high-range resolution, at least three distinct problems arise.

First, where the range axis 210 is close to parallel with the snowpack layers 214a-214d, reflections from adjacent layers 214a-214d in the snowpack 204 become confused and become adulterated. However, where the orientation of the range axis 210 becomes more normal, as in the second expanded view 208, the resolvable regions 212a-212f are better oriented to distinguish reflections relative to adjacent strata/layers 214a-214d.

Second, the differing orientations of the range axis 210 relative to the snowpack layers 214a-214d in the first 206 and the second 208 expanded views indicate that reflections travel different distances along the range axis 210 from different layers 214a-214d depending on the orientation of the range axis 210, making it difficult to determine the relative location and thicknesses of the layers 214a-214d in the snowpack. In the first expanded view 206, where the range axis 210 is almost parallel, great distances must be traveled before boundaries between layers 214a-214d are traversed, making the snowpack 204 and its layers 214a-214d appear very thick. In the second expanded view 208, where the range axis 210 is almost normal to the snowpack 204, the distances traveled more accurately indicate the actual locations and thicknesses of layers 214a-214d within the snowpack 204.

For reasons discussed with respect to FIG. 1 and FIG. 2, and for additional reasons, the radar systems in the prior art must remain close to a snowpack which they probe for information. Also, radar systems in the prior art must maintain the orientation of their range axis relative to snowpack stratigraphy constant along the contour of the snowpack to determine the location from which reflections originate relative to snowpack stratigraphy. For this reason, radar systems are positioned in the prior art directly on top of the snowpack on a sled or beneath a low-hovering helicopter.

FIG. 3 depicts a system 300 exemplary of additional aspects of the situation in the prior art. An antenna 302 depicted in FIG. 3 transmits electromagnetic energy from a prior-art radar system (not shown) to a snowpack 304 that is disposed close to the antenna 302—directly underneath the antenna 302. The antenna 302 is oriented so that the direction of propagation 306, of the waves it transmits, is substantially normal to the contour of the snowpack 304 and the various layers 310-316 that make up the stratigraphy of the snowpack 304.

Since the antenna 302 is maintained close to the snowpack 304, the size of the footprint 318 allows reflections from different portions of the snowpack 304 to be resolved. Additionally, since the direction of propagation 306 is maintained normal to the snowpack 304, the relative location of layers 310-316 in the snowpack 304 and the thicknesses of those layers 310-316 can be determined by the distances traveled by reflections from those layers 310-316.

Unfortunately, such radar systems 300 lose the principal benefits of radar. Such benefits include the ability to scan large areas remotely. These benefits could be employed in the service of meeting the needs of more-objective, less-time-consuming, more-efficient, and safer approaches to acquiring information from volumes in a snowpack 304 over large areas. A radar system 300 that must be maintained close to the snowpack 304 and maintained so that the orientation of the direction of propagation 306 relative to the snowpack 304 is known, cannot meet these needs.

What are needed are a method, an apparatus, and a system capable of scanning large regions of a snowpack to acquire information from within the snowpack from a distance. Such information should be relevant to addressing questions such as, but not limited to, the location of an avalanche victim, the flow patterns of avalanches, regions occupied by avalanche debris, the stratigraphy of a snowpack as it relates to avalanche formation, and the snow/water equivalence of a snowpack. To achieve these ends, such approaches should be capable of remotely pinpointing the location from which reflections back to the radar system originate in three-dimensional space with high resolution.

SUMMARY

The invention has been developed in response to the present state of the art and, in particular, in response to the problems and needs in the art that have not yet been fully solved by currently available methods, apparatus, and systems. Accordingly, the invention has been developed to provide an improved method, apparatus, and system to remotely acquire information from volumes in a snowpack. The features and advantages of the invention will become more fully apparent from the following description and appended claims, or may be learned by practice of the invention as set forth hereinafter.

Consistent with the foregoing, a method to remotely acquire information from volumes in a snowpack is disclosed herein. In certain embodiments, such a method may include transmitting electromagnetic energy toward a snowpack from a remote location. This electromagnetic energy results in reflections from the snowpack. Data about these reflections are processed to determine reflection values for different volumes within the snowpack.

The method may further include modulating the transmit frequency. The frequency is modulated over a sufficient bandwidth, or group of bandwidths to resolve distinct volumes within the snowpack with respect to a first axis. The first axis may be considered in certain embodiments, but not necessarily all embodiments, as the range axis. In certain embodiments, the transmit frequency may be modulated across multiple different frequency spans to acquire information about responses from different portions of the electromagnetic spectrum so that, for example and without limitation, information about the response of a snowpack to frequencies in C-band, X-band, and/or any of the K-bands, or different portions of these bands can be acquired.

Additionally, the method may further include translating an antenna system, for transmitting and receiving the electromagnetic energy over an area to create a synthetic aperture capable of discriminating and resolving reflections with respect to a second axis and a third axis. These second and third axes should be substantially orthogonal to the first axis and to one another. The antenna system is translated, whether linearly, or along a curving path, over an area with dimensions sufficient to resolve distinct volumes within the snowpack with respect to the second and third axes. The second axis and the third axis may be considered in certain embodiments, but not necessarily all embodiments, as the azimuth and elevation axes respectively. In certain embodiments, the bandwidth or bandwidths, and the dimensions of the area of the synthetic aperture with respect to the second and third axes are sufficient to achieve resolution commensurate with thicknesses for different layers of interest in the stratigraphy of the snowpack. In some embodiments, the area of the synthetic aperture can be curved so that the antenna positions are also defined with respect to the direction-of-propagation axis.

Also, the method may involve positioning the antenna system to maintain a relative orientation to a region of interest within said snowpack that ensures that electromagnetic energy incident upon said snowpack arrives at a sufficiently shallow grazing angle or angles. The sufficiently shallow grazing angle maximizes the ratio of returns from volume scattering within the snowpack to returns from reflections from the ground underneath. The regions of interest may comprise, without limitation, a region of the snowpack wherein a victim of an avalanche may be buried, a region with the potential for including avalanche debris, a region important to determining snow-water equivalencies for a watershed, a region from which avalanche formation may occur, and a slope that may be skied.

Reflection values may be analyzed to determine, without limitation, a location for an avalanche victim, to determine a three-dimensional distribution for avalanche derbies, to determine snow-water equivalencies for a watershed; to determine snow densities associated with high-quality snow for powder skiing, and for properties relevant to avalanche prediction. Analysis may involve comparison to reflection models developed from empirical sampling and/or computer modeling over one or more sets of frequencies. Such reflection models may be informed by, without limitation, snow density, average ice grain size, average ice grain shape, water content, and expected resonance profiles for particular sizes and/or shapes.

An apparatus/system for remotely retrieving information from a snowpack may include a signal conditioning module that generates electromagnetic energy at various frequencies within a bandwidth, or multiple bandwidths across different spans of frequencies in the electromagnetic spectrum, with sufficient power to transmit the energy to a snowpack from a remote location through an antenna system. The signal conditioning module receives reflections through the antenna system.

The apparatus/system, in certain embodiments, further comprises infrastructure for translating the antenna system over an area to create a synthetic aperture capable of discriminating and resolving reflections with respect to a second axis and a third axis that are substantially orthogonal to one another. The infrastructure translates the antenna system over an area with sufficient dimensions with respect to the second and third axis sufficient to create a synthetic aperture that can resolve distinct volumes within the snowpack with respect to these two axes. The signal conditioning module stores data about the reflections and the locations of the antenna system, at which transmissions are made and reflections are received, in a memory device communicatively coupled to the signal conditioning module. A processor communicatively coupled to the memory device determines reflection values for different volumes within the snowpack by running an algorithm, such as, but not limited to, the backprojection algorithm, embedded in software. Additionally, the apparatus/system maintains an orientation of the antenna system relative to the snowpack to maximize returns from volume scattering within the snowpack and to minimize returns from the ground.

BRIEF DESCRIPTION OF THE DRAWINGS

In order that the advantages of the invention will be readily understood, a more particular description of the invention briefly described above will be rendered by reference to specific embodiments illustrated in the appended drawings. To better understand the advantages of the present invention, the drawings depicting the present invention can be compared against drawings of existing technologies in the prior art. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

The components of the present invention, as described with reference to the Figures herein, could be arranged and designed in a wide variety of different configurations. Thus, the detailed description of the embodiments of the invention that follows is not intended to limit the scope of the invention, but rather to provide certain examples of presently contemplated embodiments in accordance with the invention. The presently described embodiments will be best understood by reference to the drawings.

As will be appreciated by one skilled in the art, the present invention may be embodied as an apparatus, system, of method. Elements of the present invention may combine hardware and software components (including firmware, resident software, micro-code, etc.) in their embodiment that may all generally be referred to herein as a "module." A module may be realized on a combination of one or more computer-usable or computer-readable medium(s). Without limitation, the computer-usable or computer-readable medium may be an electronic, magnetic, optical, electromagnetic, infrared, or semiconductor system, apparatus, device, or propagation medium.

The module may also embody computer program code for carrying out operations. The code may be written in any combination of one or more programming languages, including an object-oriented programming language such as Java, Smalltalk, C++, or the like, and conventional procedural programming languages, such as the "C" programming language, or similar programming languages.

The present invention is described below with reference to flowchart illustrations and/or block diagrams of a method, apparatus, and systems according to embodiments of the invention. Each block of the flowchart illustrations and/or block diagrams, and combinations of blocks in the flowchart illustrations and/or block diagrams, may be implemented by computer program instructions or code. These computer program instructions may be implemented on a processor or other programmable data processing apparatus to produce a machine, such that the instructions, which execute via the processor of the computer or other programmable data processing apparatus, create infrastructure for implementing the functions/acts specified in the flowchart and/or block diagram block or blocks.

Figure 4:
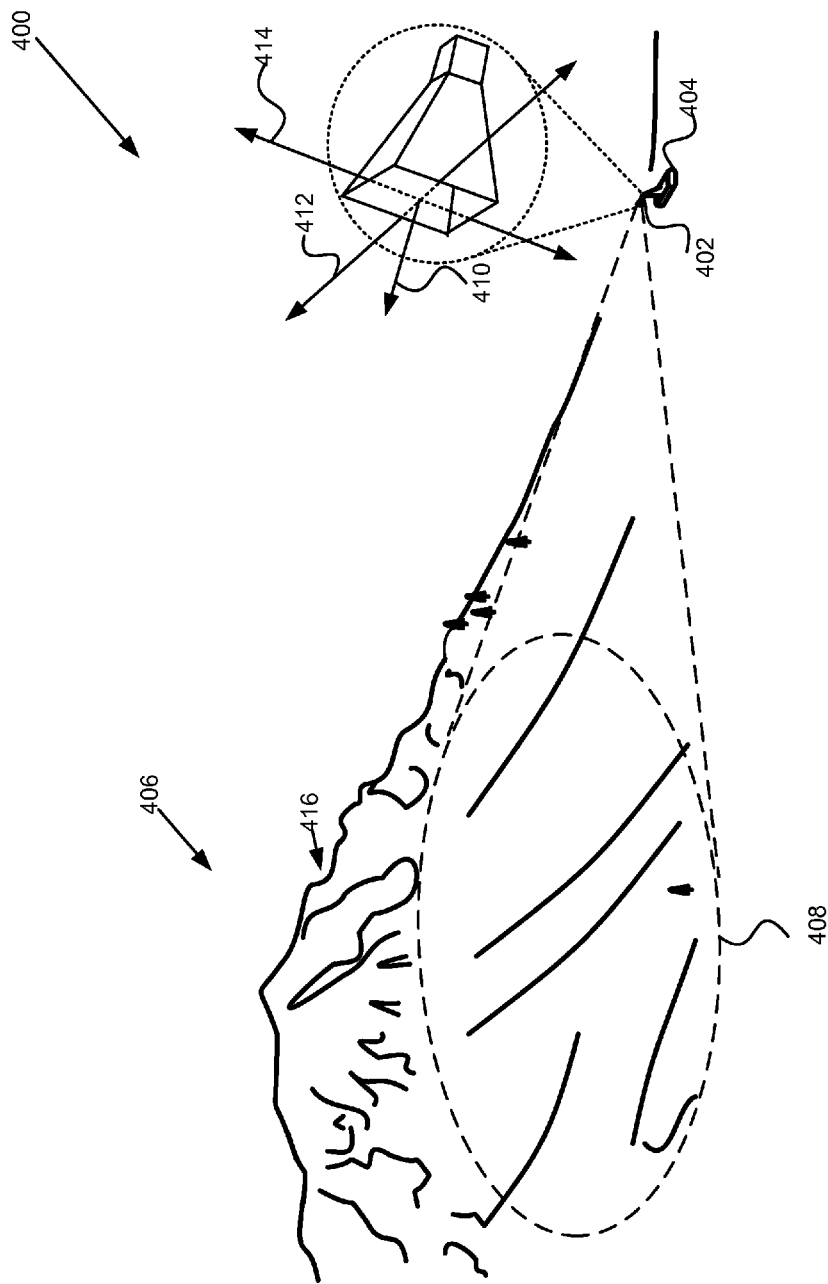
FIG. 4 depicts one embodiment in accordance with the present invention.

FIG. 4 depicts aspects of one embodiment 400 in accordance with the present invention. In the illustrated embodiment 400, an antenna system 402 and supporting infrastructure 404 are depicted transmitting electromagnetic energy toward a snowpack 406 that reposes on a remotely disposed mountain. The transmitted electromagnetic energy illuminates a region of interest 408 within the alpine snowpack 406. Electromagnetic reflections from the snowpack are received by the antenna system 402 and supporting infrastructure 404. For the embodiment depicted in FIG. 4, reflections come primarily from the region of interest 408. The supporting infrastructure 404 includes a memory device (not shown) for storing data about received reflections. The supporting infrastructure 404 may include memory and a processor (not shown) necessary to process the data to determine reflection values for different volumes within said snowpack. The processing of data will be discussed in greater detail below.

Although the antenna system 402 depicted in FIG. 4 is a horn antenna, those of ordinary skill in the art will recognize that multiple horn antennas, one or more dish antennas, an antenna array, a patch antenna, or any other device for coupling electromagnetic energy into the air for transmission may also be employed. The antenna system 402 causes plane waves of electromagnetic energy to propagate along a first axis 410 that can be, but does not need to be, referred to as the range axis. As discussed with relation to FIG. 6, the location from which reflections originate with respect to the range axis may be determined by modulating the frequency of the transmitted electromagnetic energy, as has been done in the prior art to probe snowpacks for information at close range.

However, as depicted in FIG. 4, the embodiment 400 seeks to probe a snowpack remotely at a distance that for all but impracticality large antenna apertures result in unacceptable beam widths. The remote distance is crucial because it preserves the benefits of radar to acquire quantitative data from large areas relatively quickly, efficiently, and safely. Information is acquired over large areas because the regions of interest 408 comprise integral wholes over large area.

To successfully probe a snowpack for information remotely, the ability to discriminate and resolve reflections from within the beam width of an antenna with respect to additional axes is required. Since the contours of a snowpack and/or avalanche debris, strata within the snowpack, or a victim or object of interest within the snowpack may be located in three dimensional space, the location from which reflections of interest originate needs to be determinable in three dimensional space.

One way in which reflections may be discriminated and resolved along an axis is by creating a synthetic aperture along that axis. To discriminate and resolve locations from which reflections originate in three dimensional space, according to one embodiment, the antenna system 402 is translated along a second axis 412 that is substantially orthogonal to the first axis 410 and along a third axis 414 that is substantially orthogonal to the first axis 410 and to the second axis 412. In some embodiments, the antenna system 402 may also follow curved and/or diagonal paths to occupy different positions with respect to the second axis 412 and the third axis 414. In certain embodiments, the antenna system 402 may even also occupy different positions with respect to the first axis 410 while occupying different positions with respect to the second axis 412 and the third axis 414.

By translating the antenna system 402 along the second axis 412 and along the third axis 414 a synthetic aperture can be generated along the second axis 412 and along the third axis 414 that can be used to discriminate and resolve locations from which reflections originate with respect to the second axis 412 and the third axis 414. The second axis 412 and the third axis 414 may be referred to, but need not be referred to, as the azimuth axis and the elevation axis respectively.

Failure to acquire information from the integral whole that is the region of interest 408 could result in a failure to answer the question. For example, the avalanche victim may not be found. The region of interest 408 comprises a substantially indivisible region of a snowpack that should be probed to garner sufficient information to address questions about a snowpack or what resides therein. Examples of such questions may include, without limitation, questions about the location of an avalanche victim (whether for a rescue or for a recovery), the extent of the region occupied by avalanche debris and/or and the path of an avalanche, the risk of avalanche formation presented by certain weaknesses in the snowpack in a region from within which avalanche formation occurs for a particular avalanche track, the snow/water equivalence of the snowpack for purposes of measuring a watershed, and snow depths across a ski slope.

The region of interest 408 in FIG. 4 exemplifies regions of interest that should be scanned to acquire information necessary to address several questions presented in the preceding paragraph. For example, the region of interest may circumscribe the region that could be occupied by avalanche debris and flow paths from the chutes found in the band of rocks 416 near the summit of the mountain. The region of interest 408 may also circumscribe the region in which an avalanche victim, from an avalanche forming in the chutes in the rock band 416, may be buried. Alternatively, the region of interest 408 may circumscribe a bowl where avalanches form for an avalanche track (not shown) below the region of interest 408. Since an avalanche may be triggered from any location in the region of interest 408 where the snowpack 406 is the weakest, the entire region of interest 408 needs to be scanned. Another possibility for the region of interest 408 is that it may circumscribe a bowl that makes a significant contribution to a watershed. Additional possibilities are contemplated.

As appreciated, the region of interest 408 in FIG. 4 spans a large area. To make localized, physical measurements, or close-range measurements with a radar system whose range-axis orientation relative to the snowpack must be maintained would either place large demands on time and resources, or impractical demands. The embodiment 400 in FIG. 4 collects information over the large area of the region of interest 408 from a single remote location, reducing demands on time, resources, and avoiding safety issues that could arise from taking measurements in avalanche terrain. In certain embodiments, the region of interest 408 may be scanned from more than one remote location. However, the remoteness of these multiple locations, from which the orientation of the range axis need not follow the contour of the snowpack, allows the scan to be performed in a manageable amount of time with manageable demands placed on resources.

The remote location from which the antenna system 402 and supporting infrastructure 404 illuminate the region of interest 408 is selected to insure that the waves of electromagnetic energy incident upon the region of interest arrive a shallow grazing angle, or shallow grazing angles. For the purposes of the present invention, a grazing angle of 45° or less is considered to be a shallow grazing angle.

Figure 5:
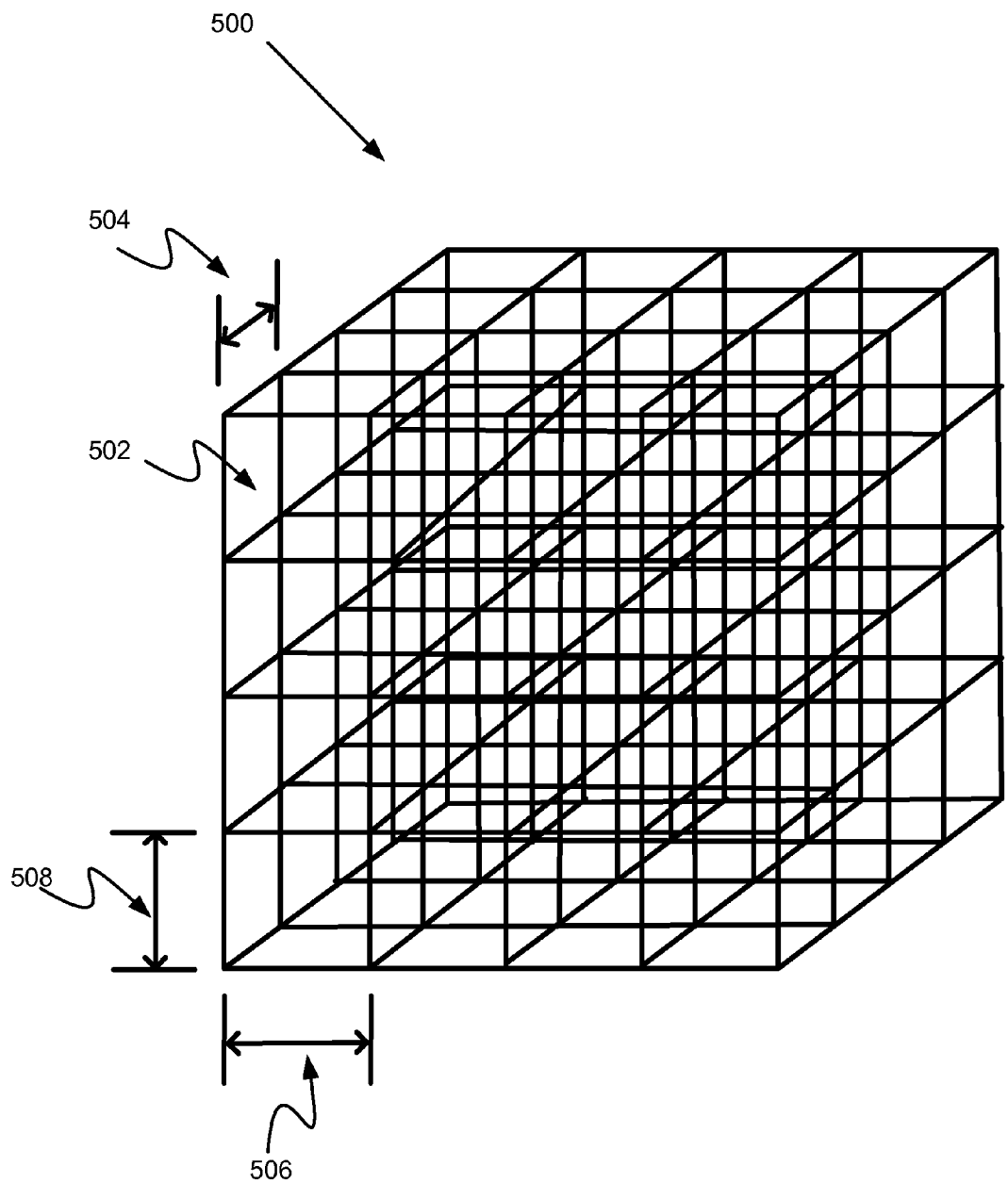
FIG. 5 depicts a collection of empty voxels corresponding to different volumes in a snowpack.

The ability to discriminate and resolve locations from which reflections originate in three dimensions, as discussed with respect to FIG. 4, creates the possibility to image the volume of a snowpack in three dimensions. FIG. 5 depicts a collection of empty voxels 500—a voxel is the three-dimensional analog to a pixel—that describes the structure of a three-dimensional, volume image. In certain embodiments, the reflection values for different volumes in the snowpack are aggregated to form such three-dimensional volume images for purposes of analysis. Regardless of the embodiment, however, the structure of the three dimensional image in FIG. 5 is instructive insofar as the distinct volumes in the image correspond to distinct volumes in the snowpack. Limitations and possibilities that exist for the distinct volumes in the image correspond to limitations and possibilities for acquiring information about distinct volumes in a snowpack.

In FIG. 5, the upper, left-most voxel 502, or unit of distinct volume, serves as a representative voxel. The voxel 502, as with all other voxels in the collection of voxels 500, is assigned a reflection value by the processing algorithm to be discussed below. The value may be real or complex, depending on the embodiment. Real values represent the magnitude of returns from reflections within the volume of the voxel 502, with the imaginary component in embodiments with complex values being reserved for phase information.

Each voxel 502 is defined by a range length 504, an azimuth length 506, and an elevation length 508. The axes along which the range length 504, azimuth length 506, and elevation length 508 are defined correspond to the first axis 410, second axis 412, and third axis 414 discussed above with respect to FIG. 4. Depending on the embodiment, the range length 504, azimuth length 506, and elevation length 508 may be the same lengths, or may differ in length from one another. The lengths may correspond to the resolution limit along a particular axis, as defined below in the discussions of FIG. 6 and FIG. 7; the lengths may be larger than the resolution units; or, they may be smaller, where interpolation is involved.

Every voxel 502 in the collection of empty voxels 500 corresponds to a specific physical volume within the snowpack, where the dimensions of the physical volume correspond to the range length 504, azimuth length 506, and elevation length 508 of the corresponding voxel. The collection of voxels 500, therefore, provides information from within the volume of the snowpack.

In several important embodiments, the a collection of voxels 500 is not aggregated to form a three-dimensional, volume image, but rather, a reflection value for a region of space that corresponds to an actual physical volume and would correspond to a voxel 502 is considered independently, or in conjunction with additional reflection values, for analysis, as discussed in more detail below with respect to FIG. 17.

Figures 6A, 6B:
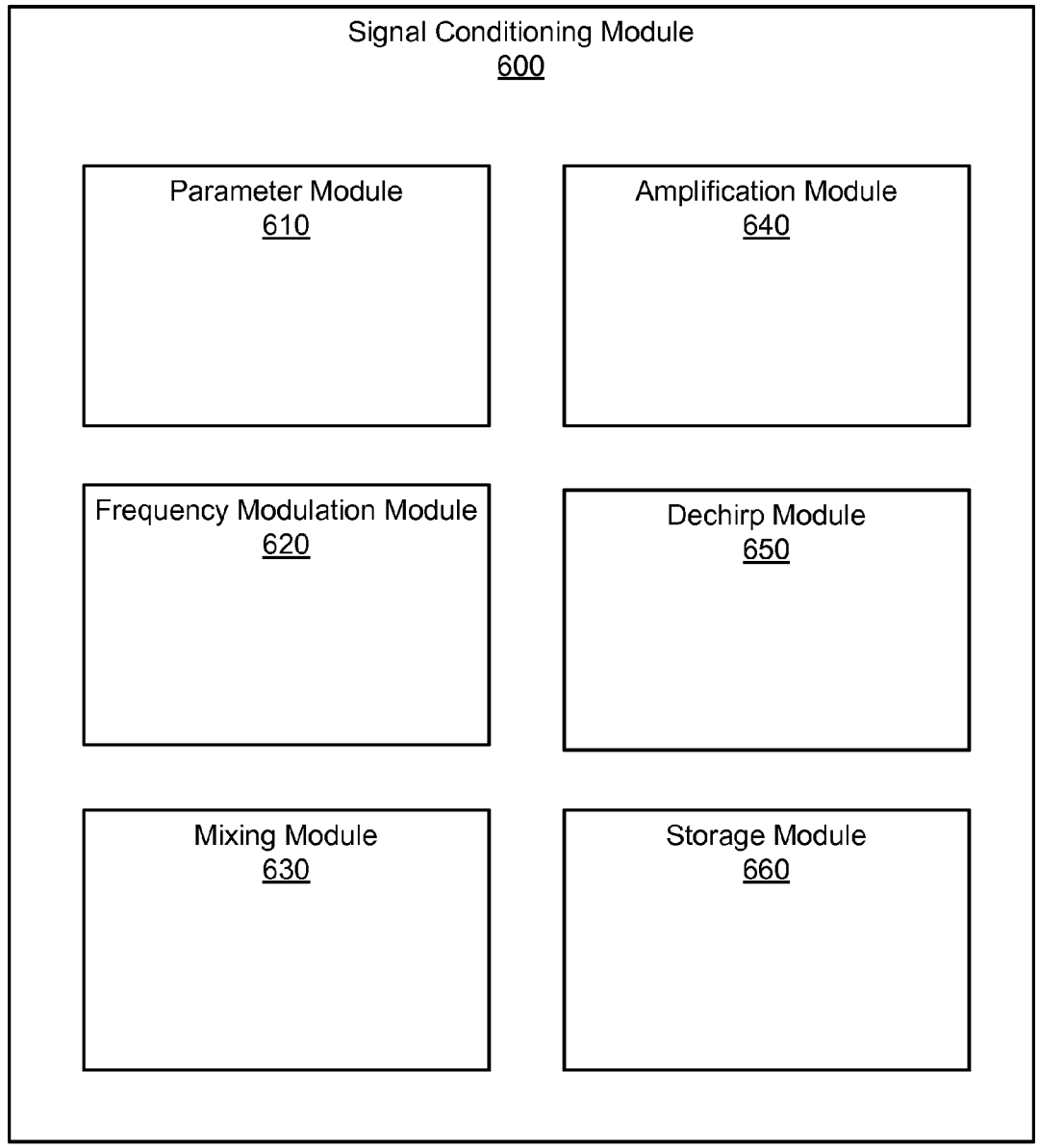
FIG. 6a provides a schematic depiction of a signal conditioning module as employed in one embodiment in accordance with the present invention.
FIG. 6b provides an equation that defines the relationship between range-resolution and bandwidth.

FIG. 6a provides a schematic depiction of a signal conditioning module 600. In certain embodiments, the signal conditioning module 600 is part of the supporting infrastructure 404 depicted in FIG. 4 that makes the remote transmission of electromagnetic energy to a snowpack possible in such a way that reflection values can be determined for different volumes within the snowpack. The signal conditioning module 600 in FIG. 6a is only representative of certain embodiments—not all embodiments—and is provided only to teach one embodiment of the present invention, without limiting alternative embodiments of the invention to elements of the signal conditioning module 600 in FIG. 6a.

In FIG. 6a, the signal conditioning module 600 comprises a parameter module 610, a frequency modulation module 620, a mixing module 630, an amplification module 640, a dechirp module 650, and a storage module 660. Alternative embodiments may have additional, fewer, or different elements. The parameter module 610 provides information about the parameters necessary to generate a transmit signal capable of producing reflections from which reflection values for different volumes in a snowpack can be calculated.

Such parameters may include a start frequency for a linear chirp, a stop frequency, and/or a bandwidth. Depending on the embodiment, multiple start and stop frequencies may be included to acquire response information from multiple portions of the electromagnetic spectrum. Although the use of linear frequency modulation greatly reduces the complexity of processing, the frequency modulation need not be linear. In certain embodiments, the signal conditioning module 600 may produce a transmit signal that is a frequency modulated continuous wave. In alternative embodiments, the signal conditioning module 600 may produce a transmit signal that is pulsed. In such embodiments, the parameter module 610 includes information necessary to control the pulse sequence, such as a pulse repetition frequency (PRF) and a ramp rate. In certain embodiments, the parameter module 610 may be a field programmable gate array, but several other possibilities may also be employed, such as a custom chip. The parameter module 610 may be communicatively coupled with the frequency modulation module 620.

The frequency modulation module 620 generates the range of frequencies necessary to discriminate and resolve reflections with respect to the first axis 410 discussed above with respect to FIG. 4. The bandwidth over which the transmit frequency is modulated determines the degree to which reflections may be resolved with respect to the first axis 410, according to Equation 2, as provided in FIG. 6b, where resolution 'r' is equal to the speed of light 'c' divided by twice the bandwidth 'B.' According to Equation 2, a bandwidth of 1.5 GHz allows 10 cm resolution, a value sufficiently fine to resolve many of the layers of weakness important to avalanche formation within a snowpack. In other embodiments, coarser resolutions with smaller bandwidths are sufficient. In certain embodiments, larger bandwidths with finer resolution may be employed.

The frequency modulation module 620 may include a voltage controlled oscillator capable of creating an analogue transmit signal that spans one or more predetermined bandwidths. The frequency module may also include a Stable Local Oscillator (STALO) and one or more Direct Digital Synthesizer (DDS) chips to synthesize discrete frequency steps to span one or more predetermined bandwidths from the stable frequency provided by the STALO. In embodiments that employ discrete frequencies, the demands of the Nyquist theorem must be satisfied to prevent aliasing. Several alternative arrangements of hardware and software can also be employed to create the requisite frequencies.

A snowpack, its constitutive layers, snow types, grain and crystal sizes and shapes, water contents and distributions, densities, objects buried therein (such as an avalanche victim) respond differently to different wavelengths and portions of the electromagnetic spectrum. In some embodiments, it is desirable to acquire information about how the snowpack responds to more than one portion of the electromagnetic spectrum. Therefore, in some embodiments, the frequency modulation module 620 creates frequencies that span multiple bandwidths from different portions of the electromagnetic spectrum. In such embodiments, enough frequencies are produced for each portion of interest in the electromagnetic spectrum to allow for discrimination and resolution of reflections with respect to the first axis 410 without recourse to the frequencies generated for other portions of interest in the electromagnetic spectrum. As a result, for example, information about the response of a snowpack to different spans of frequencies/wavelengths in C-band, X-band, and/or any of the K-bands, or different portions of these bands, can be acquired and compared. Information from frequency bands not listed may also be acquired.

In certain, but not necessarily all embodiments, the signal created by the frequency modulation module 620 becomes the input to a mixing module 630. The mixing module 630 mixes an input signal with a carrier frequency provided by the mixing module. The input signal may be mixed with the carrier frequency directly or through intermediate stages. The source for the carrier frequency may come from a variety of oscillators or may itself be the product of mixing. Several configurations of hardware and software are possible. The carrier frequency may belong to any number of bandwidths from the radio and microwave spectrums.

Carrier frequencies in C-band are useful for penetrating very dense snow, such as that is often found in avalanche debris. Frequencies from higher bands, such as those in X-band, Ku-band, K-band, and Ka-band have potential for providing more refined information about properties of snow stratigraphy. The invention may also be practiced with carrier frequencies outside of these enumerated bands.

The output of the mixing module may, in certain embodiments, be amplified by the amplification module 640. In certain embodiments, amplification may take place elsewhere. The amplification module 640 gives the transmit signal sufficient power to transmit remotely to a snowpack and to produce the reflections used in processing to create reflection values for different volumes in the snowpack. Since the signal conditioning module 600 modulates the frequency of the transmit signal it generates, the power necessary to create reflections can be spread over large durations of time without compromising range resolution. Therefore, the power requirements of the signal conditioning module 600 may be measured in Watts to fractions of a Watt, allowing the signal conditioning module to be small, light-weight, and portable within the mountainous terrain where avalanches occur. In certain embodiments, the amplification module 640 may have stages and/or may be adjustable.

In certain embodiments, the signal conditioning module 600 includes a dechirp module 650 configured to receive reflections from a snowpack. The dechirp module 650 includes a variety of mixers, filters, and other hardware necessary to mix the transmit signal with a signal comprised of reflections from a snowpack. After mixing, a sum signal and a difference signal result. The sum signal has a frequency equal to the sum of the frequency of the transmit signal and the frequency of the receive signal. The difference signal has a frequency equal to the difference of the frequency of the transmit signal and the frequency of the receive signal. The sum signal is filtered by a low pass filter. The frequency of the difference signal can be correlated with the distance with respect to the first axis 410 from which the reflections responsible for the difference signal originate by referencing the ramp rate of the linear chirp of the transmit signal. Innumerable variations on this concept are possible.

The dechirp module 650 may be communicatively coupled with a storage module 660. The storage module 660 records data about received reflections, whether processed in a manner akin to that described with respect to the dechirp module 650 or not. In some embodiments, reflections from several transmission pulses are stored together. Reflections from multiple pulses are aggregated to improve Signal to Noise Ratio (SNR). The data is recorded in a manner so that it can be processed to create reflection values for different volumes in the snowpack. For example, the data may be indexed by frequency and the position of an antenna system 402 similar to the one depicted in FIG. 4. The position information indicates the position of the antenna system 402 from which transmissions are made and reflections received. The data may be saved on a compact flash card, flash drive, hard drive, writable disc, magnetic tape, or any other medium capable of recording data.

Several alternative embodiments may create the requisite transmit signal according to different configurations. For example, in one creative embodiment, the transmit signal may be generated by a network analyzer that has been modified to serve as a radar. In many embodiments, commercially available systems can be employed as-is, or with modification, to produce the requisite transmit signal.

Frequency modulation in the transmit signal can be used to determine the location, with respect to the first axis 410 depicted in FIG. 4, from which reflections originate. To create data from which reflection values for different volumes in a snowpack may be generated, the location from which reflections originate with respect to a second axis 412 and a third axis 414 must also be determinable. Data from which such determinations can be made, as discussed, can be generated by creating a synthetic aperture extending along the second axis 412 (azimuth axis) and the third axis 414 (elevation axis) depicted in FIG. 4.

Figures 7A, 7B, 7C, 7D:
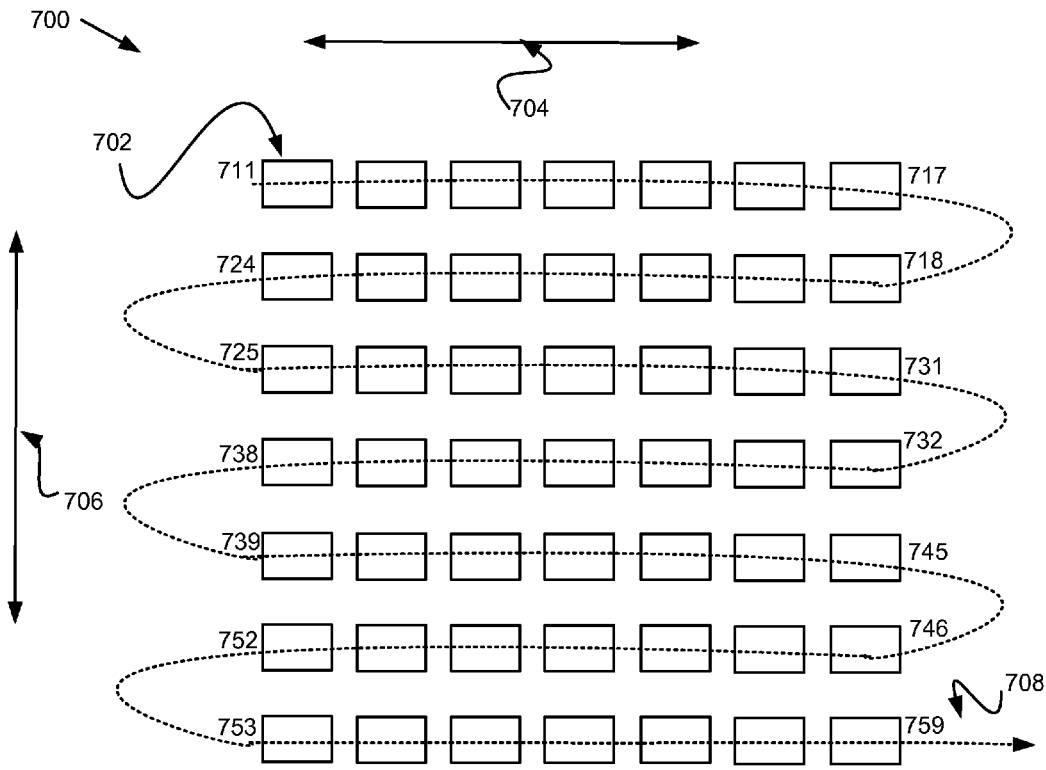
FIG. 7a depicts a synthetic aperture generated from an antenna system that is translated over an area in accordance with the present invention.
FIG. 7b provides an equation that defines the relationship between resolution along an axis of a synthetic aperture and the distance traversed by the antenna system within the area of the synthetic aperture along that axis.
FIG. 7c provides an equation that defines the relationship between the maximum achievable resolution of a synthetic aperture and the length of a constitutive antenna used to create that synthetic aperture.
FIG. 7d provides a table with the dimensions that a synthetic aperture must obtain in two dimensions to provide 10 cm resolution, with respect to two dimensions, at different frequencies and ranges.

FIG. 7a depicts a synthetic aperture 700 generated from an antenna system 702 that is translated over and area with respect to an azimuth axis 704 and an elevation axis 706. In the particular embodiment depicted in FIG. 7a, the antenna system 702 is translated over time along a path 708 within a plane depicted by the surface of the page. As the antenna system 702 traverses the path 708, the antenna system 702 occupies a number of positions 711-759 that create a grid of rows along the azimuth axis 704 and columns along the elevation axis 706.

The path 708 traversed to create the synthetic aperture 700 in FIG. 7a begins in the upper, left corner, follows the azimuth axis 704 from position 711 to position 717 before dropping down with respect to the elevation axis 706 to return to the left side at position 724. The path 708 continues in a serpentine manner until position 759 is achieved in the bottom right corner. Innumerable different possibilities for paths 708 exist. The path 708 could begin in any corner and could start by moving up, down, left, or right.

The path need not be rectilinear, but may include diagonal and/or curved elements. The path may even have circular components as it fills out different positions with respect to the azimuth axis 704 and the elevation axis 706. As discussed above with respect to FIG. 4, in some embodiments, the antenna system 702 may also follow curved and/or diagonal paths (not shown) to occupy different positions with respect to the azimuth axis 704 and the elevation axis 706. In certain embodiments, the antenna system 702 may even also occupy different positions with respect to the direction of propagation while occupying different positions with respect to the azimuth axis 704 and the elevation axis 706.

In some embodiments, the antenna system 702 transmits and receives from each of the positions 711-759. In certain embodiments, the antenna system 702 continually transmits and receives, but data is only recorded at the positions 711-759. In other embodiments, the antenna system 702 continually transmits and receives and data is continuously recorded The processing algorithm uses the progression in phase that accumulates between different positions 711-759 to determine locations with respect to the axes of the synthetic aperture 700. Therefore, to preserve the necessary phase information, the positions 711-759 from which transmissions are made and from which reflections are received must be known accurately and indexed with the data to preserve phase information. As a reference, position information is sufficiently accurate where positions 711-759 are known relative to a first position 711 to within a tenth of the wavelength of the carrier frequency of the transmit signal. However, this standard may be adjusted either up or down while still practicing the invention.

The resolution with which reflections may be resolved with respect to the azimuth axis 704 and the elevation axis 706 are a function of the distances between the furthest most positions occupied by the antenna system 702 along these axes. For a particular axis 704, 706, the resolution is defined by Equation 3, as provided in FIG. 7b, where 'R' denotes range, 'λ' denotes wavelength, and 'D' represents the distance traversed along the axis for which range is defined.

For reasons discussed in the prior art on synthetic apertures, the dimension of the aperture of the antenna system 702 place an upper limit on resolution with respect to the axis of the synthetic aperture parallel to the dimension of the aperture. Equation 4, as provided in FIG. 7c, defines this upper limit in terms of a length, 'l,' describing the dimension of the antenna system 702 aperture. Equation 3 can be used to calculate the dimensions that would be required of a synthetic aperture 700 for a desired resolution. Table 1, as provided in FIG. 7d, gives a dimension that would be required of the synthetic aperture 700 with respect two orthogonal axes to achieve 10 cm resolution, with respect to these axes, at various ranges and frequencies. The invention can be practiced at different resolutions, different frequencies, and different ranges. The large dimensions indicated in Table 1 can by drastically reduced by practicing the invention with multiple remote scans.

Additionally, to prevent aliasing, the positions 711-759 need to be spaced sufficiently close together along each axis 704, 706 of the synthetic aperture 700 to satisfy the Nyquist requirement. As a reference, a spacing of a quarter of the aperture dimension of the antenna system 702 is sufficient. However, the invention may be practiced with different standards.

The supporting infrastructure necessary to create a synthetic aperture of sufficient dimensions can take a variety of different forms. The infrastructure (not shown) may comprise a ground based system of step motors, optical encoders, lead screws, and tracks arrayed on a frame. In embodiments that make use of a frame, the frame may take a variety of shapes, including an "inverted T" shape, where the central post moves from side to side as is common with near field scanners. The frame may have a rectangular shape, or any other shape necessary to provide support for the tracks. The infrastructure may include belts and/or chains, servo motors, pulleys, or any other device that can be used to translate the antenna system 702 and provide accurate information about antenna system 702 positions 711-759. The infrastructure may translate multiple antenna systems 702 at the same time, each transmitting and receiving reflections at the same time, or at different times. Alternatively, the infrastructure may comprise a system of cables. To provide an example of the range of forms the infrastructure used to create the synthetic aperture 700 can take, the infrastructure may comprise a group of robotic helicopters coordinated and oriented by laser triangulation. The range of possibilities is large.

In FIG. 7a, the synthetic aperture 700 resides in a plane and the antenna system 702 always faces so that the direction of propagation is out of the page for all of positions 711-759. In alternative embodiments, however, the antenna system 702 may be rotated in two dimensions to focus on a target location from individual positions 711-759, as would be done in one dimension in a method for synthetic aperture formation commonly referred to as the steered spotlight method. Additionally, in certain embodiments, the positions 711-759 of the antenna system may occupy locations in a surface curved in two dimensions, as opposed to a plane, as would be done in one dimension in a method for synthetic aperture formation commonly referred to as the geometric spotlight method.

To practice the invention, the synthetic aperture 700 depicted in FIG. 7 is deployed remotely. Remote deployment allows the synthetic aperture 700 to transmit to a large area of a snowpack similar to the region of interest 408 depicted in FIG. 4. As discussed in the background section, information from within a snowpack must be acquired over a large area to be useful in answering questions that arise with a snowpack. Such questions may include, without limitation: the potential for avalanche formation within a region where avalanches form; the location of an avalanche victim for purposes of recovery or rescue; the course of an avalanche flow pattern and the extent of an area occupied by avalanche debris to determine where property, trails, ski slopes, and activities can safely be located, or the location of an avalanche victim; the snow/water equivalence of a region important to a watershed; and the depth of snow over ski slope. Additional regions of interest are contemplated.

Data needs to be collected from a snowpack in a way that reflection values for three dimensional volumes can be calculated. Embodiments discussed provide examples of how the transmit signal can be modulated in frequency and modulated in space to form a synthetic aperture that allows data to be collected in this way. At this point, a discussion is provided of the ways in which data is processed to render the required reflection values for different snow volumes.

The different frequencies and angles from different positions in the synthetic aperture produce different magnitudes and phases for the backscatter from the same volume of space. Without these changes in frequency and angle, only a single magnitude and phase would be present. These differing magnitudes and phases are responsible for the data that is captured by the radar. In certain embodiments, the data is indexed by antenna position and transmit frequency. Processing this data involves taking the different magnitude and phase information and reconstructing the volumes from which different reflections originate.

The reflections from volumes are recorded in the data for each antenna position. Moving from data to reflection values for those volumes requires the gathering up of energy corresponding to the various volumes as received at various antenna positions and determining the location of those volumes from that energy. Various algorithms, tailored to different deployment modes for the antenna positions in the synthetic aperture, can achieve this goal. All of these algorithms must know where to look in the data for the energy associated with each volume.

The Point Spread Response (PSR) for a particular antenna, antenna deployment mode and signal processing scheme, provides the requisite information about where in the data energy for a given location can be found. A wide variety of algorithms make use of the PSR for a particular antenna deployment to determine reflection values for different volumes in a snowpack. The most general algorithms include a simple matched filter and the backprojection algorithm. The backprojection algorithm is used widely in synthetic aperture radar signal processing because of its improved efficiency. Those of ordinary skill in the art will recognize additional algorithms and variations on those mentioned that are best suited to particular embodiments.

Where the backprojection algorithm is employed, and with different algorithms and variations, the data from a signal conditioning module 600 with a dechirp module 650 similar to the one depicted in FIG. 6a is first range compressed. Often range compression is performed by executing a Fast Fourier Transform (FFT) on frequency and position indexed data. Range compression enhances the data by improving the range-resolution of the data.

The processing algorithms may be implemented in a wide variety of languages ranging from C to MATLAB scripts. The processing can take place on a wide variety of computing systems with memory and a processor. In many embodiments, a common laptop will suffice.

Figure 8:
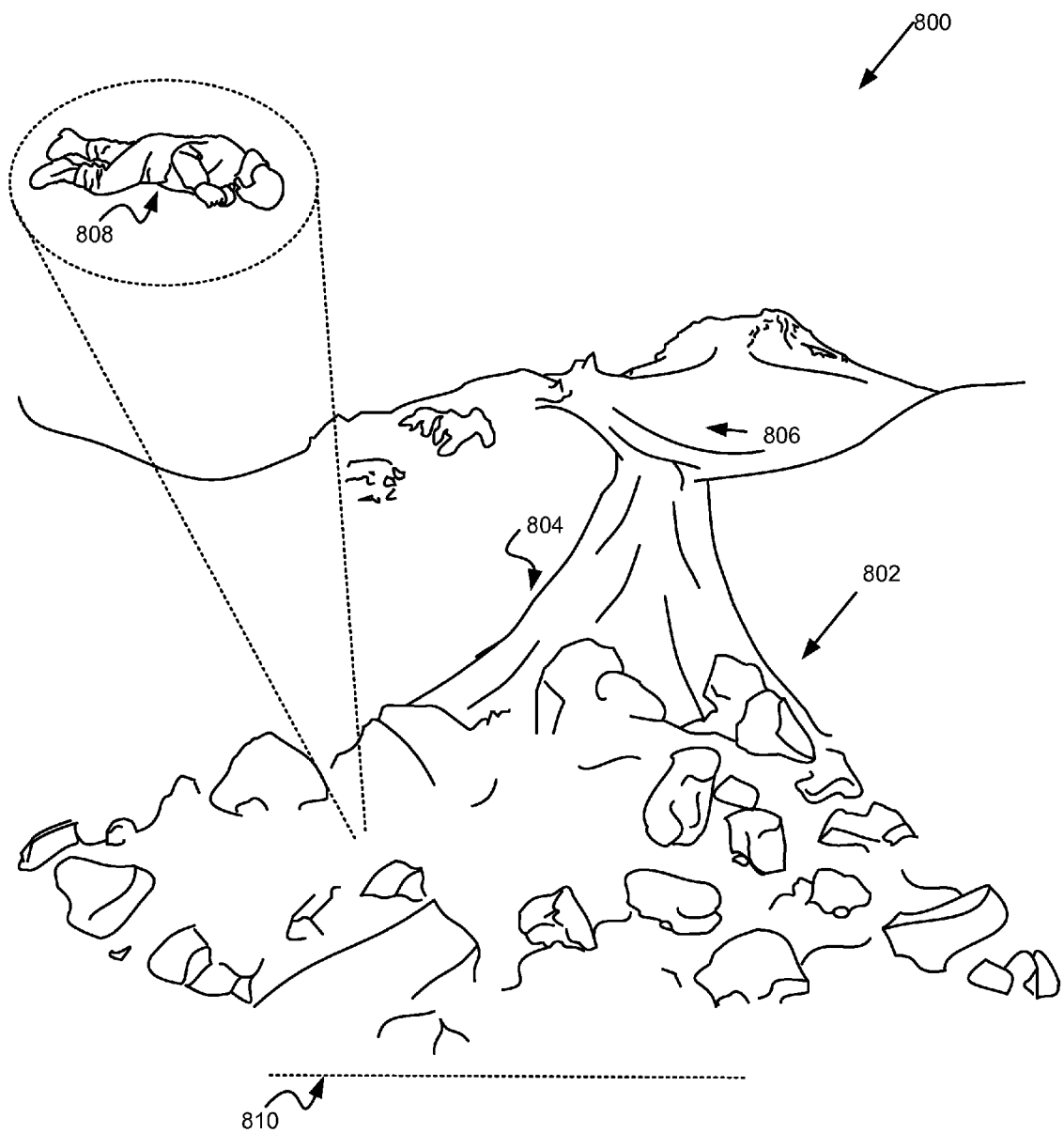
FIG. 8 depicts different possible regions of interest within a snowpack to which electromagnetic energy is transmitted in accordance with the present invention.

FIG. 8 depicts features in mountainous terrain 800 typical of the terrain in which an alpine snowpack resides. FIG. 8 can be used to further discuss potential regions of interest. In FIG. 8, avalanche debris 802 strewn across an avalanche flow path 804 is depicted underneath the bowl/slope 806 where the avalanche formed.

In certain embodiments, the region of interest 408, as depicted in FIG. 4, is a bowl/slope 806 similar to the one depicted in FIG. 8, where avalanche formation occurs. Avalanche formation starts where the cohesion within or between the layers 308-316, similar to those depicted in FIG. 3, breaks down. As discussed in more detail below with respect to FIG. 11 and FIG. 12, certain commonly occurring layers in a snowpack, such as, without limitation, wind deposited snow, faceted snow, buried surface hoar, depth hoar, and crusts, are known for their weakness. These layers make up the stratigraphy of the snowpack, which is notorious for varying widely over distances as small as a meter.

The stratigraphy of a snowpack varies widely due to changes in aspect, elevation, wind pattern, terrain, and a variety of additional factors. Since avalanche formation occurs at the weakest point within the stratigraphy of the snowpack residing in the bowl/slope 806, improved avalanche prediction requires the extraction of information about snowpack stratigraphy across the entire bowl/slope 806.

In embodiments that acquire information about the potential of avalanche formation, information is sought about snowpack stratigraphy, layers of weakness, and the properties of such layers, as discussed in more detail below. To acquire this information, resolution along the range length 504, azimuth length 506, and elevation length 508 depicted in FIG. 5 should be fine. Considering the thicknesses of important layers of interest and practical limitations, resolutions around 10 cm are suggested, but finer and courser resolutions easily fall within the ambit of the invention.

Figure 13:
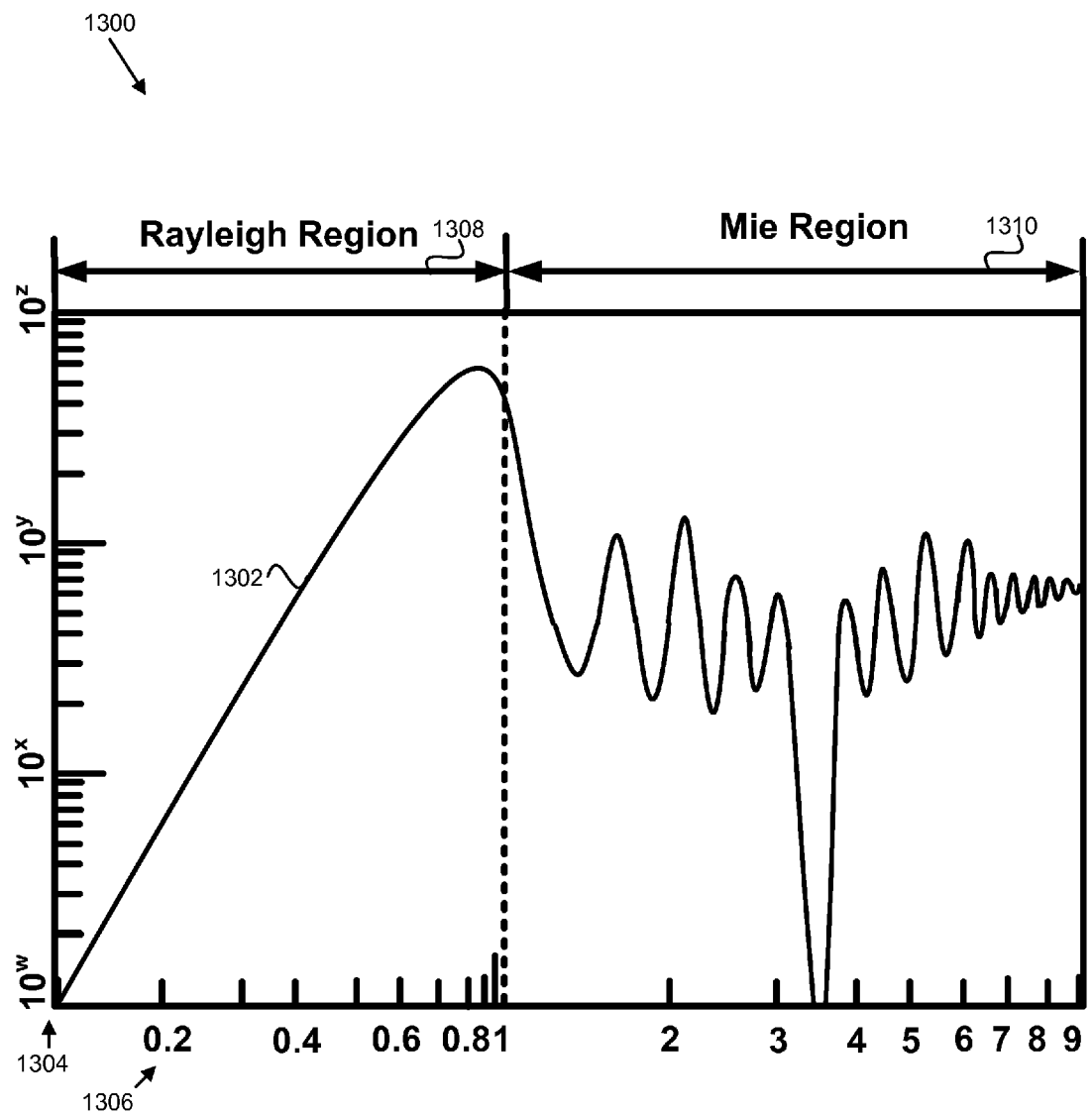
FIG. 13 depicts a characterization of reflection values for an imagined ice grain of a particular size and shape as a function of wavelength.

As discussed in more detail with respect to FIG. 13, frequencies in the X-, Ku-, K, and Ka-bands have the most potential for acquiring information about stratigraphy. At the upper frequencies from the K-bands and at higher frequencies the potential for high attenuations in the transmit signal become a factor. However, higher and lower frequency bands may also be used. In important embodiments, frequencies from different bands and/or form different portions of a particular band may be used to acquire information about the different responses in the snowpack to wavelengths from different portions of the electromagnetic spectrum.

In an important class of embodiments pertaining to the present invention, an entire region of interest that can include an avalanche path 804 and avalanche debris 802 must be scanned to determine the location of an avalanche victim 808. The avalanche victim 808 may be found in any location within the avalanche path 804—often a large area. Reflection values are analyzed for indications of the presence of the avalanche victim 808.

The location of the victim 808 may be determined by the unique electromagnetic properties of the victim's body. These unique electromagnetic properties result in marked differences in reflection values at the location of the victim 808. This is especially true in a rescue operation where the body is still warm and has a high liquid content. Different reflection values may be the result of volume scattering caused by the victim's unique electromagnetic properties or by boundary reflections between the snow and materials that make up the victim's body.

Additional embodiments transmit to a region of interest to determine the flow path 804 and the extent of avalanche debris 802. Since avalanches commonly reoccur in common locations, this information is important for determining where property may be developed and where activities can be engaged in safely. Sometimes this information can help to find an avalanche victim 808.

To determine the flow path 804 and the outer boundary 810 that an avalanche could reach with sufficient probability in the future, a region where an avalanche flow path 804 and avalanche debris 802 can be found must be scanned with regularity to account for multiple flows. Often an avalanche flow path 804 and avalanche debris 802 can be buried in a snowpack, even by the storm that triggers them. Avalanche debris 802 can be distinguished from the snowpack in which it is buried by the variation in density from the surrounding snowpack. In such embodiments, where densities are high, the density of avalanche debris 802 suggests the use of C-band frequencies, but additional frequency bands are also within the ambit of the invention.

In certain embodiments, the bowl/slope 806 comprises a region of interest for purposes of determining the snow/water equivalence of the snowpack, as the bowl/slope 806 may be an important contributor to a watershed. In such embodiments, the snow/water equivalence may simply be estimated from the volume of the snowpack, as discussed in more detail with respect to FIG. 9. In more sophisticated embodiments, reflection values may be analyzed to determine snow properties such as, without limitation, density and water content, within different portions of the snowpack, where higher densities and water contents correlate with higher reflection values.

In a similar embodiment, the depth of the snow may be assessed across the bowl/slope 806 to determine if the bowl/slope 806 is in condition for helicopter skiing, or if, at a ski resort, the bowl/slope 806 requires additional man-made snow. As an example of a previously un-suggested region of interest, in certain embodiments, several slopes similar to the bowl/slope 806 in FIG. 8 could be assessed for their snow density to determine the slope with the lightest-density, "powder" snow for purposes of determining where to deposit helicopter-skiing clients, or which slopes would most desirably be accessed by skiers of all types.

Figure 9:
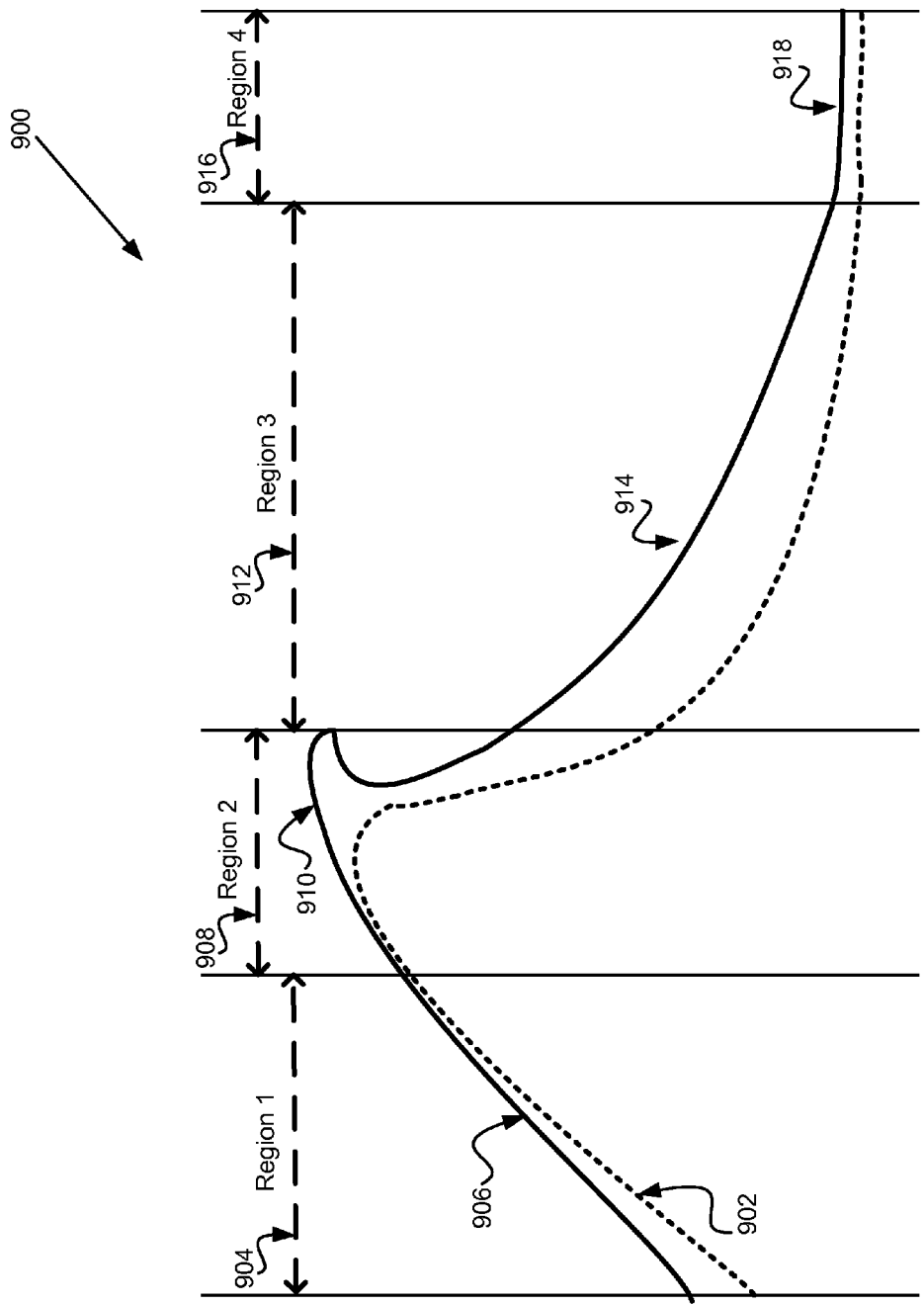
FIG. 9 depicts a typical snowpack of varying depths that reposes in mountainous terrain.

FIG. 9 depicts a snowpack 900 of varying depths that reposes in mountainous terrain 902. In embodiments, such as those that seek to determine snow/water equivalence, changes in snow depth, such as those shown in FIG. 9 are important. FIG. 9 is segmented into three distinct regions, a first region 904 that contains wind-swept snow 906 on the windward side of a wind-swept slope, a second region 908 that includes a cornice 910, a third region 912 that includes snow accumulations 914 in a bowl, and a forth region 916 that includes unaltered snow depths 918. An assumption that the snowpack 900 has a depth equal to that of the unaffected snow 918 in the fourth region 916, evenly distributed across the mountainous terrain 902, would have disastrous consequences when determining the volume of the snowpack 900 or a depth at a particular location.

As suggested from FIG. 9, a region of interest can cover a large area. To acquire information about these large areas efficiently, the antenna system 402 and supporting infrastructure 404 are disposed remotely from the area of interest 408, as depicted in FIG. 4. As also discussed with respect to FIG. 4, the antenna system 402 is oriented so that electromagnetic energy incident upon the region of interest 408 arrives at shallow grazing angles. Grazing angles for incident wavelengths that are sufficiently shallow maximize returns from volume scattering in volumes of said snowpack compared to reflections from the boundary between the snowpack and the ground underneath. The way in which shallow grazing angles, where the term "shallow" refers to angles at or less than 45°, achieve these goals can be explained with reference to FIG. 10*a* and FIG. 10*b*.

Figure 10A:
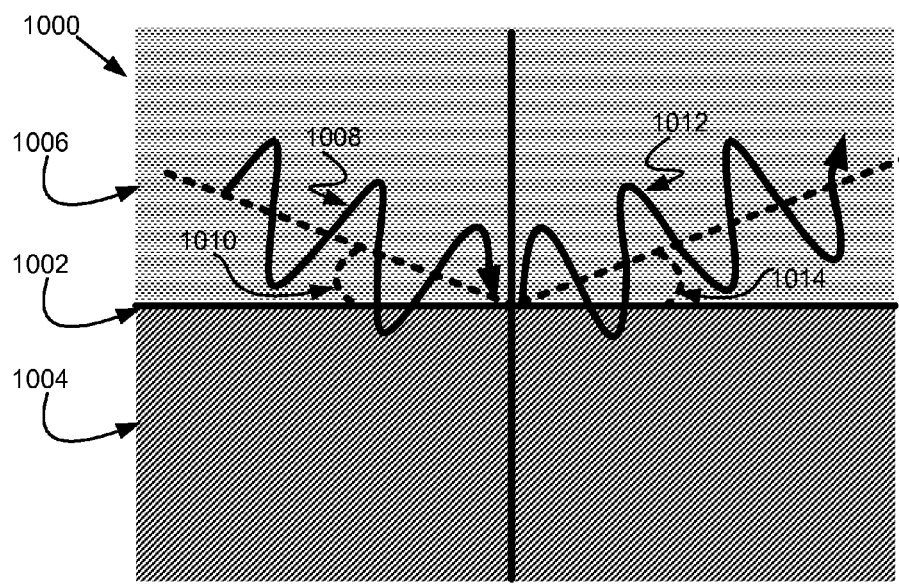
FIG. 10a depicts a boundary reflection at the boundary between the ground and the snowpack for an incident wave arriving at a shallow grazing angle.

FIG. 10*a* depicts a boundary reflection 1000 at the boundary 1002 between the ground 1004 and the snowpack 1006 for an incident wave 1008 arriving at a shallow grazing angle 1010. According to Snell's law, a portion of the incident wave 1008 is reflected away in a reflected wave 1012 at a reflection angle 1014. Also in accordance with Snell's law, the reflection angle 1014 and the shallow grazing angle 1010 are equal.

The electromagnetic energy transmitted to the ground boundary 1002 in FIG. 10*a* is reflected away in the reflected wave 1012. The boundary reflection 1000 at the ground boundary 1002 does not produce reflections back to an antenna system 402 similar to that depicted in FIG. 4. Therefore, returns from the ground are minimized together with their contributions to reflection values generated from processing the reflection data. Minimizing these contributions is highly desirable so that returns from the snowpack 1006 do not become confused with returns from the ground 1004.

Figure 10B:
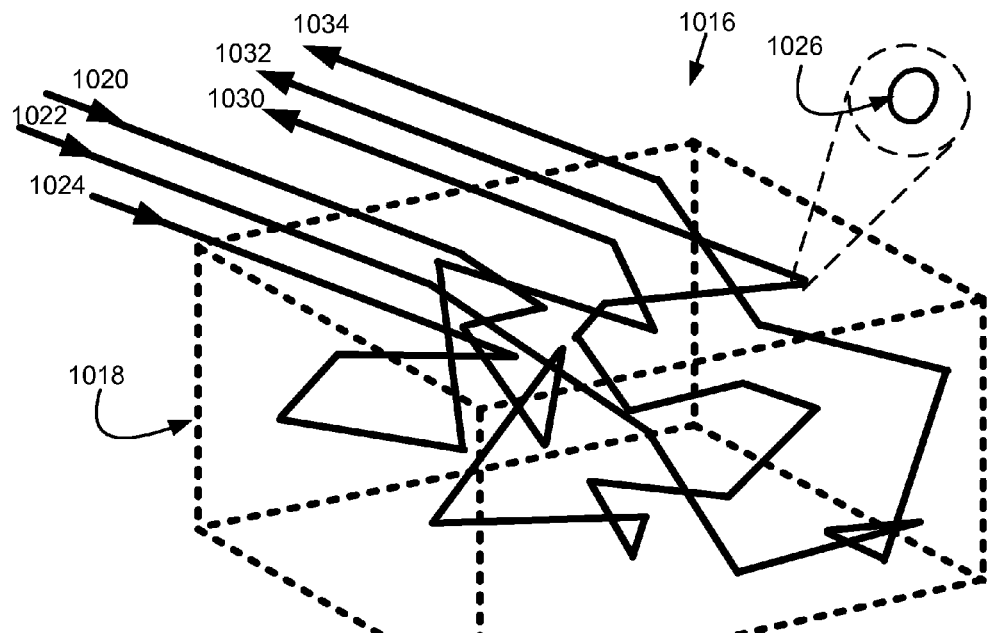
FIG. 10b depicts the volume scattering that occurs within a snowpack.

FIG. 10*b* depicts the volume scattering 1016 that occurs within a volume of snow 1018. In FIG. 10*b*, the trajectory of three transmitted waves 1020, 1022, 1024 as they ricochet off of ice grains (represented by the ice grain 1026 depicted in the expanded view) are charted within a volume of snow 1018. Eventually, these transmitted waves 1020, 1022, 1024 become reoriented back as reflections 1028, 1030, 1032. The reflections 1028, 1030, 1032 are oriented in their trajectories so that they are substantially parallel to the trajectories of the transmitted waves 1020, 1022, 1024. The reflections 1028, 1030, 1032 return to an antenna system 402 similar to the one depicted in FIG. 4.

Obviously not all the electromagnetic energy transmitted to the snow volume 1018 becomes reflected back to its source. Admittedly, FIG. 10*b* is highly idealized. Nevertheless, the ricocheting that takes place in volume scattering 1016 is much more likely to produce reflections the return to the source of transmission. Consequently, reflections 1028, 1030, 1032 from volume scattering 1016 predominate among the reflections from which reflection values are calculated during processing. The predominance of returns from volume scattering 1016 allows information from within a snowpack 1006 to be acquired without becoming confused with reflections from the ground 1004 underneath. Experimentation shows that grazing angles below 25° are sufficiently shallow for frequencies in C-band. Nevertheless the invention may be practiced with smaller or larger grazing angles in C-band and other frequency bands. As stated, for purposes of the present invention shallow grazing angles shall mean angles at 45° or less.

Figure 3:
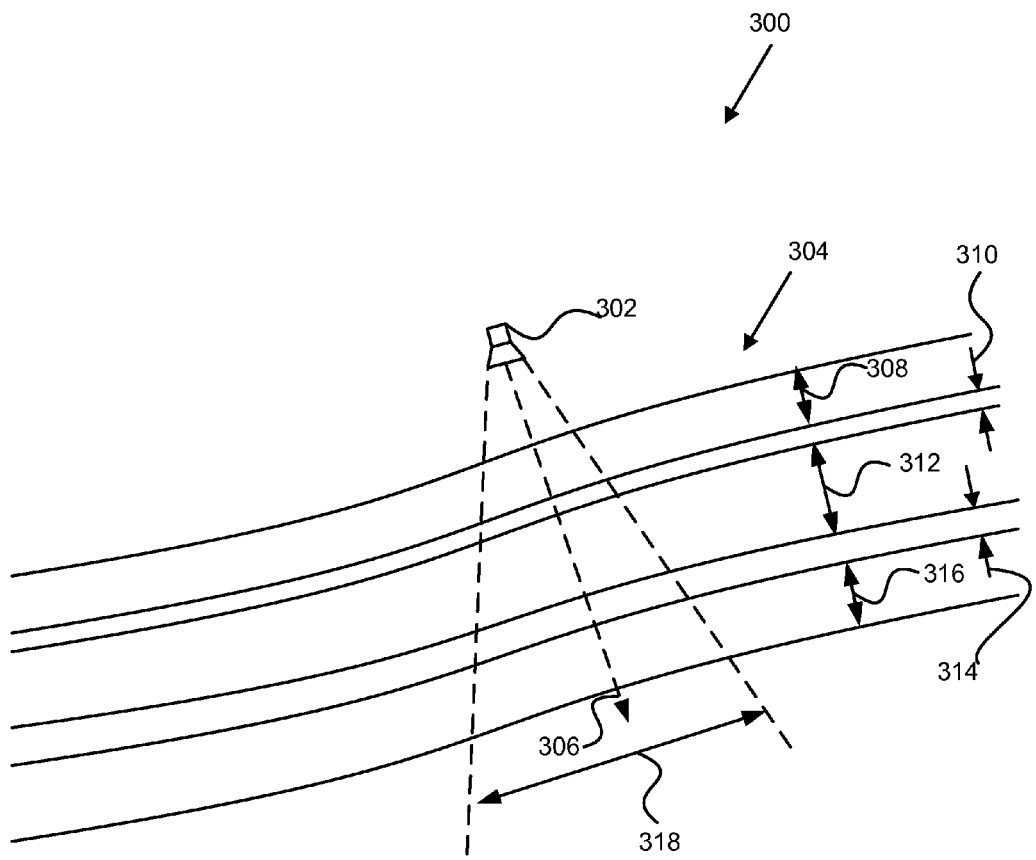
FIG. 3 exemplifies the situation in the prior art by depicting a system in which an antenna must be maintained directly above a snowpack and follow the contour of the snowpack in its orientation relative to the snowpack.

The volume scattering 1016 described in FIG. 10*b* relies on ice grains 1026 and water content from a volume of snow 1018. As indicated by the presence of different layers 308-316 in a snowpack 304, as depicted in FIG. 3, a snowpack comprises ice grains and crystals of different sizes shapes and possibly different water-content distributions at different layers in the snowpack. Additionally, different layers may represent different clustering behaviors among ice grains. These differing shapes, sizes, clustering behaviors, and possibly differing water distributions result in different reflection values for different volumes corresponding to different layers.

Figure 11:
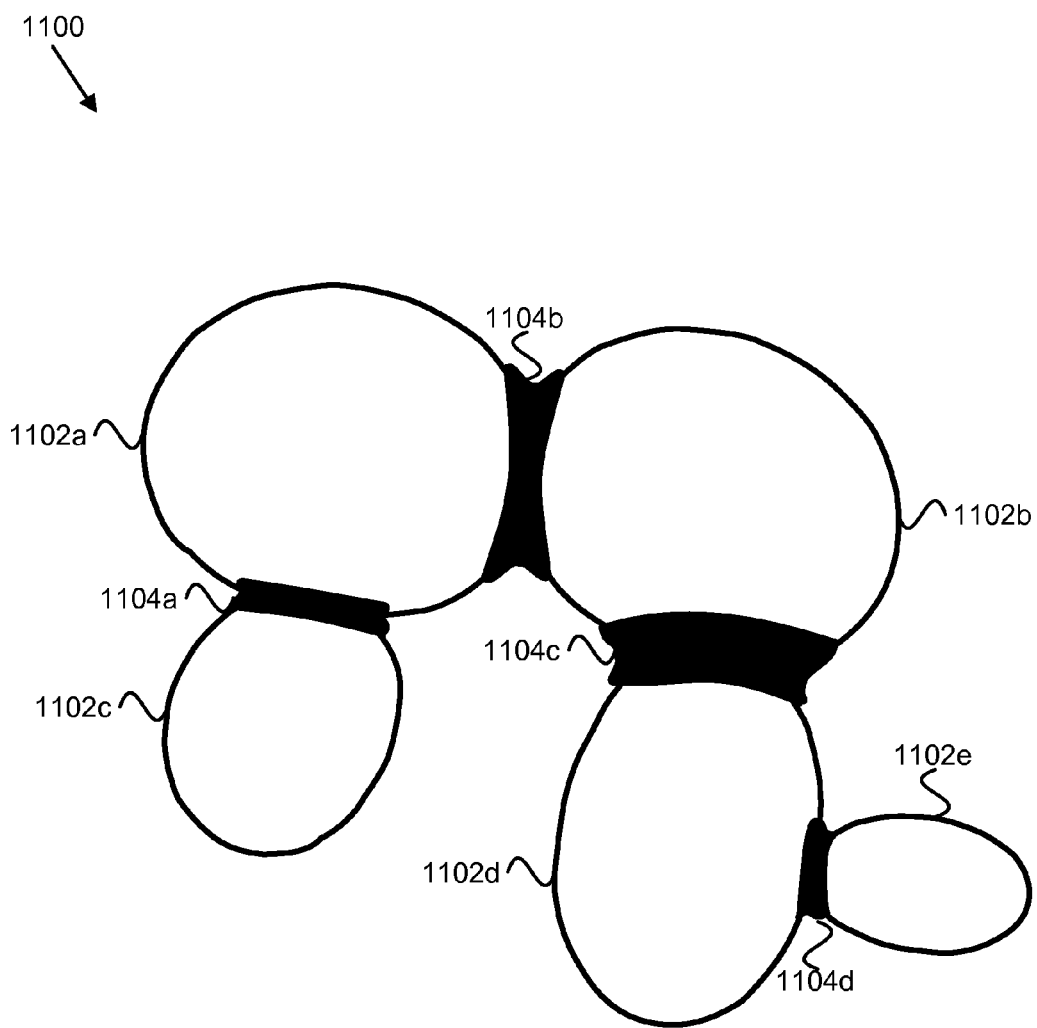
FIG. 11 depicts a cluster of ice grains 1102 and a water content distribution typical of a layer common to alpine snowpacks.

FIG. 11 depicts a cluster 1100 of ice grains 1102 and a water content distribution typical of a layer common to alpine snowpacks. As appreciated, the ice grains 1102 are rounded. Such rounded grains are commonly associated with layers of strength in an alpine snowpack. The cluster includes a large ice grain 1102*a* and a small ice grain 1102*e* for purposes of discussion. Typically, within a snowpack, ice grains 1102 of the same or similar sizes are found in the same layer. Different ice grain 1102 sizes contribute to different reflection values for different wavelengths.

Within a snowpack, ice grains 1102 grow in size as water vapor present in the snowpack freezes to ice grains 1102. Commonly, rounded grains 1102 worn down from snowflake fragments maintain their rounded shape as they grow from a small ice grain 1102e to a large ice grain 1102a. However, when a strong temperature gradient is present in the snowpack, the physics of the scenario dictate that the ice grains 1102 take on a sharp angular structure as discussed with reference to FIG. 12.

Snow completely devoid of water content is known as a dry. Initially, as water begins to manifest in the snow, it congregates at points of connection between ice grains in Pendular rings 1104, which receive their name from the Pendular regime in which such rings form, where water content is between about 0% and 8%. For higher water contents, the water inclusions start to flow together, being found wherever ice grains are not present, as is typical of the Funicular regime. The water content and its distribution also contribute to reflection values for different wavelengths.

Figure 12:
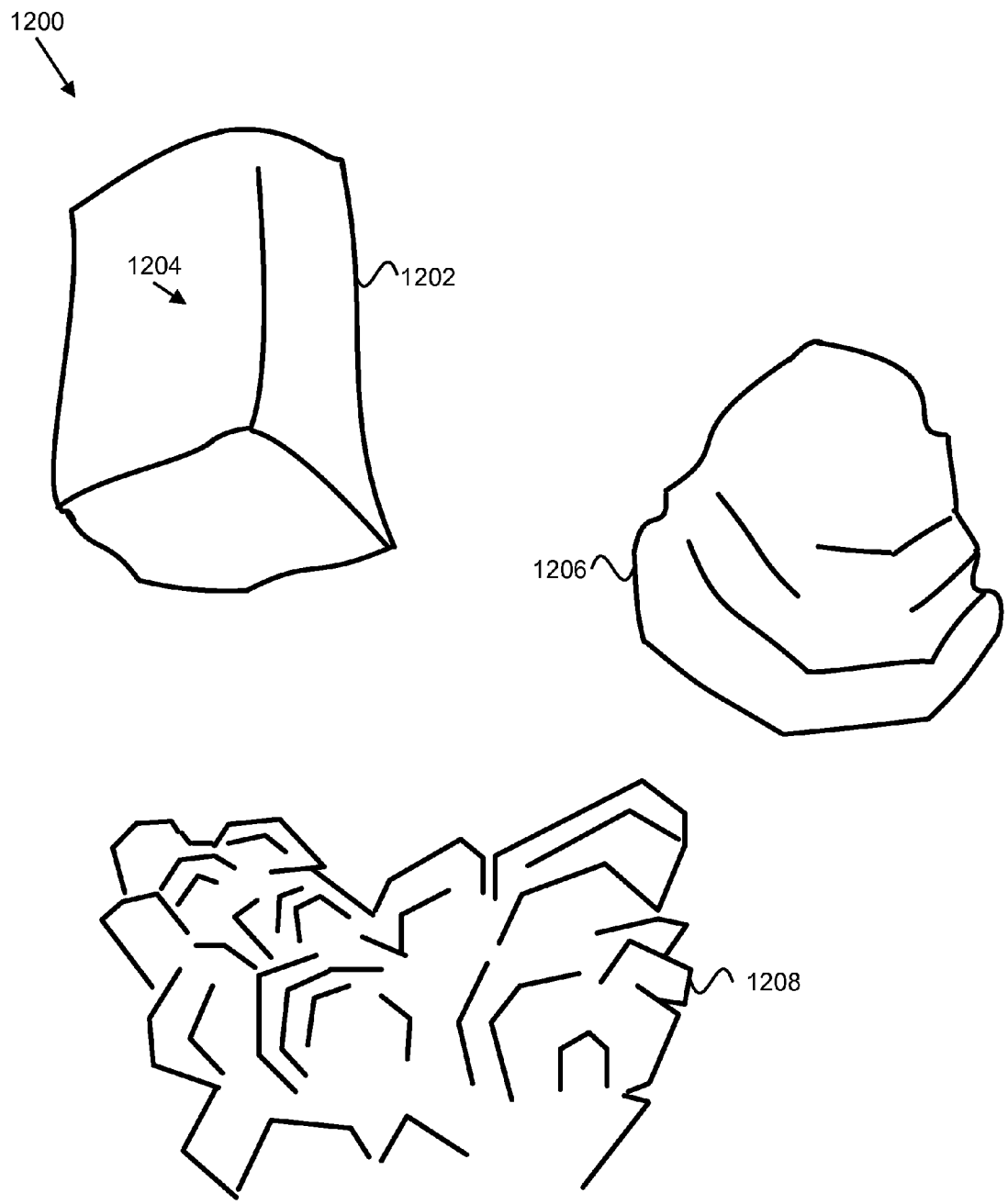
FIG. 12 depicts a collection of faceted ice grains and crystals.

FIG. 12 depicts a collection 1200 of faceted ice grains and crystals. The collection includes a faceted grain 1202, with its angular shape, as it may grow in a snowpack in the presence of a strong temperature gradient. Layers of faceted snow are known for being cohesively very weak and are the layers in which many avalanches originate. Since they must grow in the snowpack, faceted grains 1202 are typically larger than other ice grains in a snowpack.

The structure of the faceted grain is characterized by the planner region 1204 depicted, as contrasted to the rounded shape of the ice grains 1102 in FIG. 11. The planner regions 1204 and angular shape, in contrast to the rounded shapes of the round ice grains 1102, contribute to different reflection values for layers comprised of these different types of ice grains across different wavelengths. Additionally, the shape of faceted grains 1202 can alter the distribution of water content, which in turn would affect reflection values. The angular and pyramidal structure of depth hoar 1206 also presents characteristic shapes that contribute to reflection values. Depth hoar 1206, which is also associated with weak layers forms at the base of the snowpack, creating the potential for large avalanches.

Also among the collection 1200 of faceted forms is a depiction of the hexagonal crystalline shapes that grow on the surface of a snowpack in the presence of temperature gradients and are known as surface hoar 1208. These plate-like structures, also characterized with weakness when they become buried, can grow to become very large. Surface hoar 1208 is often measured in centimeters, as opposed to the millimeters and fractions of a millimeter used to measure other types of ices grains. These large sizes open the possibility for increased reflection values due to the surface roughness of the surface hoar 1208 when the wavelengths involved are sufficiently small.

Additional types of snow layers have characteristics that should represent themselves in reflection values. For example, the smooth surfaces of crusts can cause specular reflections away from a radar system at shallow grazing angles. Additionally, the high density of wind deposited snow should increase reflection values. Wind-deposited snow is infamous for increasing the load on a snowpack to the fracture point. It is also infamous for being undetected in its rapid accumulations during inclement weather. The ability of radar to scan large areas quickly provides an ideal solution for detecting and assessing this hazard.

The volume scattering 1016 discussed with respect to FIG. 10b caused by various ice grains 1026, as explored in FIG. 11 and FIG. 12, can be characterized by size, shape and the wavelengths involved, among other things. Two major divisions to characterize reflection behavior based on the ratio of the circumference of the ice grains involved to the size of the wavelengths reflected. These major divisions comprise the Rayleigh region and the Mie region.

FIG. 13 depicts a characterization 1300 of reflection values for an imagined ice grain of a particular size and shape (not shown). The characterization includes a plot 1302 of reflection values 1304 from the imagined ice grain as a function of the ratio 1306 of the circumference of the ice grain to the transmitted wavelength. The reflection values axis 1304 and the ratio axis 1306 are plotted on a logarithmic scale. Place holders are used for the magnitudes on the reflection value axis 1304 as magnitude is based on a large number of variables, including the number of transmit pulses that may be summed during processing.

The plot 1302 is characterized by two distinct regions, the Rayleigh region 1308 and the Mie region 1310. The Rayleigh region 1308 is characterized by an exponential increase in reflection values 1304 as the ratio 1306 of circumference to wavelength increases. Therefore, in the Rayleigh region 1308, information about the size of the ice grain can be obtained by comparing the reflection values 1304 from different frequencies/wavelengths that result in different ratios 1306 with those expected for a particular size. Considering the sizes of ice grains typical of a snowpack, frequencies in X-band are best suited for acquiring information about size in the Rayleigh Region 1308. However, the invention can be practiced to acquire this information in alternate frequency bands.

Figures 1A, 1B:
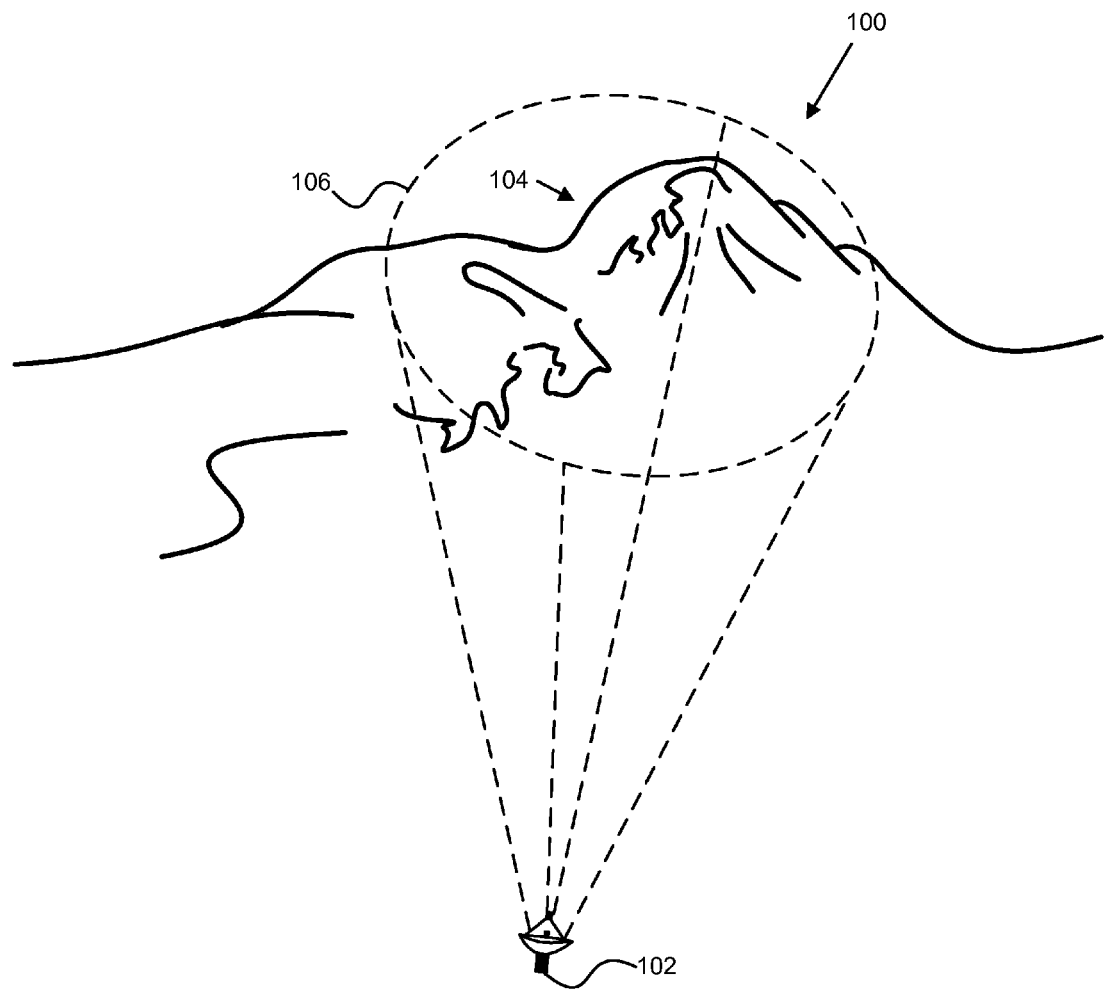
FIG. 1a exemplifies the situation in the prior art by depicting a footprint from a remotely disposed radar as it would occupy a snowpack.
FIG. 1b provides an equation that defines the relationship between the diameter of a footprint illuminated by an antenna and the range of the footprint.
Figure 2:
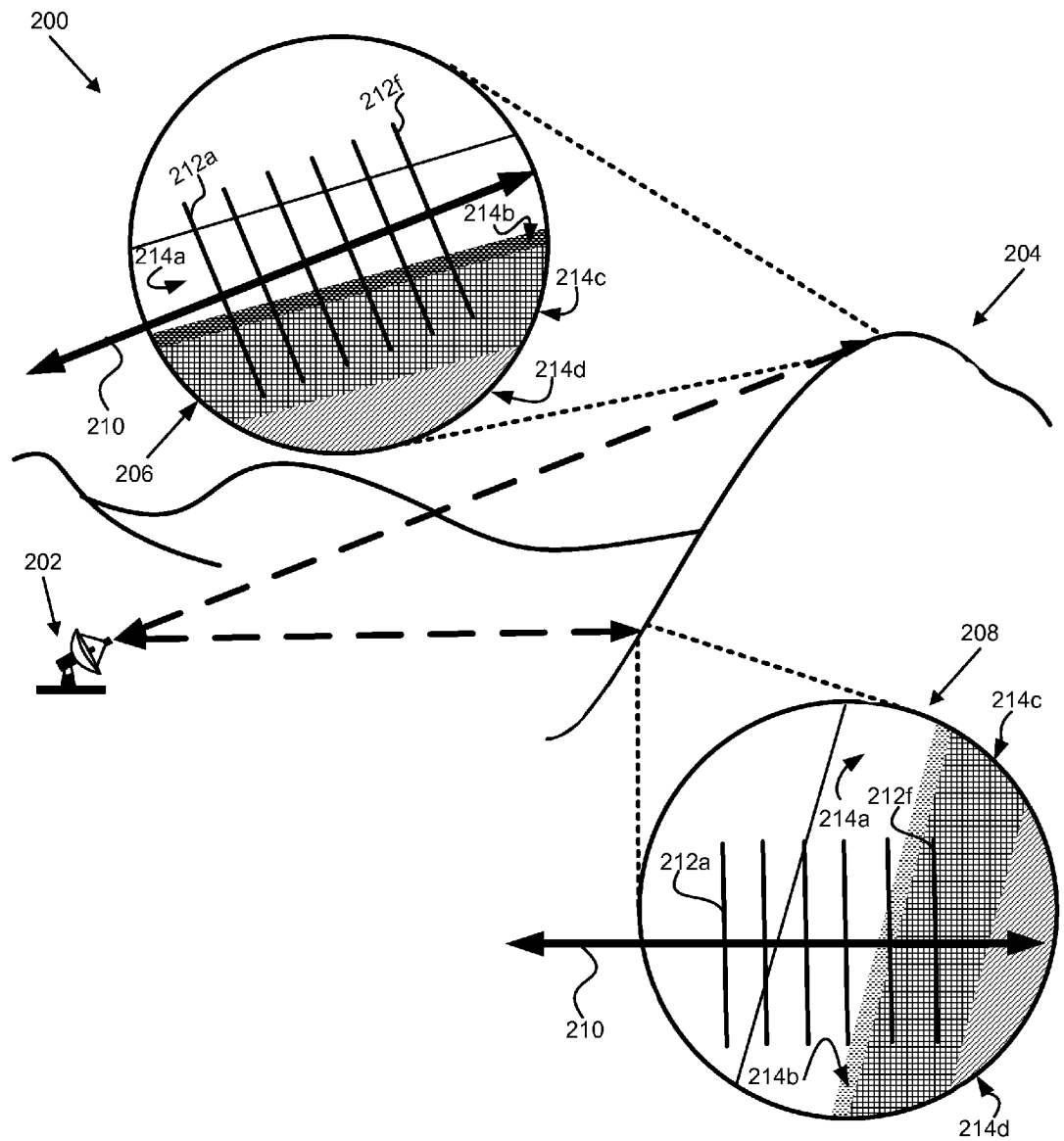
FIG. 2 exemplifies the situation in the prior art by depicting changes in the orientation of the range axis relative to a remotely disposed snowpack.

After the ratio 1306 of circumference to wavelength reaches values of about 1 and greater, the plot 1302 enters the Mie region 1310. The Mie region 1310 is characterized by a resonance profile that is a function of both size and shape. Therefore, in the Mie region 1308, information about the size and shape of the ice grains can be obtained by comparing the reflection values 1304 from different frequencies/wavelengths with those expected for a particular size or shape. Considering the sizes of ice grains typical of a snowpack, frequencies in the K-bands are best suited for acquiring information about size and shape in the Mie Region 1310. However, the invention can be practiced to acquire this information in alternate frequency bands. To determine size and size and shape information from the Rayleigh region 308 and Mie region 1310 respectively, embodiments that transmit frequencies from different portions of the electromagnetic spectrum as discussed above with respect to FIG. 2 are required.

FIG. 14 through FIG. 17 provide flow charts that set forth the logical structure of the method of the present invention. The orders depicted in the flow charts are only indicative of particular embodiments of the present invention. The orders need not be observed in all embodiments of the invention and are included only for the purposes of illustrating these particular embodiments. The ordering is also ambiguous with respect to time in the sense that steps may occur concurrently or after a wait period. Additional steps may be added that are in keeping with the overall logical structure of the invention. With different wording, fewer steps may be employed.

Figure 14:
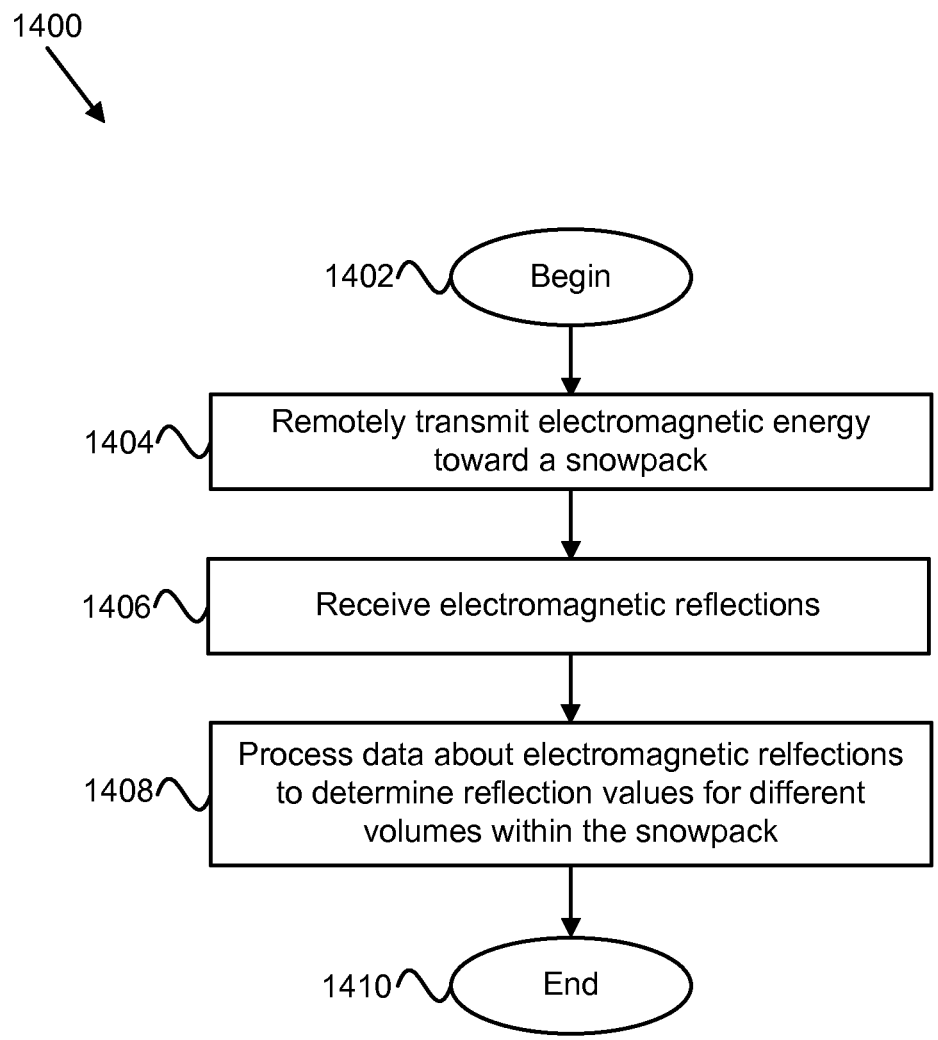
FIG. 14 is a flow chart illustrating one embodiment of a method to remotely acquire information from volumes in a snowpack in accordance with the present invention.

FIG. 14 is a flow chart illustrating one embodiment of a method 1400 to remotely acquire information from volumes in a snowpack. The method 1400 begins 1402 by transmitting 1404 electromagnetic energy to a remote snowpack. The method 1400 continues by receiving 1406 electromagnetic reflections from the snowpack. The method 1400 involves processing 1408 data about electromagnetic reflections to determine reflection values for different volumes within the snowpack. After processing the data, the method 1400 comes to an end 1410.

Figure 15:
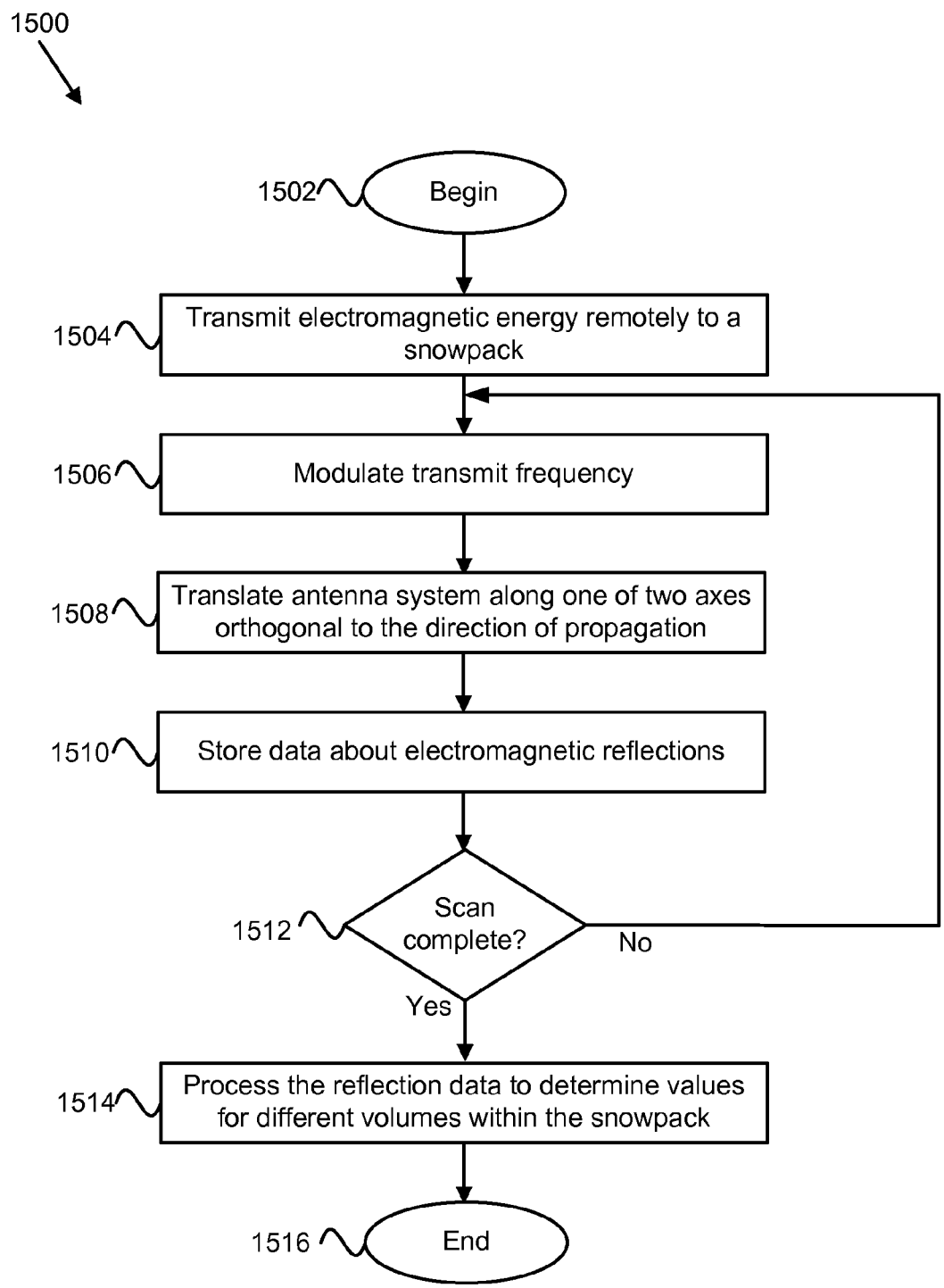
FIG. 15 is a flow chart illustrating one embodiment of a method to remotely acquire information from volumes in a snowpack by employing frequency modulation and creating a synthetic aperture in accordance with the present invention.

FIG. 15 is a flow chart illustrating one embodiment of a method 1500 to remotely acquire information from volumes in a snowpack by employing frequency modulation and creating a synthetic aperture. The method 1500 begins 1502 by transmitting 1504 electromagnetic energy to a remote snowpack. The step of modulating 1506 a transmit signal is involved.

Modulation 1506 may be performed by a frequency modulation module 620 similar to the one discussed with respect to the signal conditioning module 600 in FIG. 6*a*. Frequency modulation may or may not be linear. Frequency modulation may occur across a single bandwidth.

In certain embodiments, frequency modulation is performed across multiple different bands. In such embodiments, frequency modulation is performed across different bandwidths over a sufficient range so that reflections can be discriminated with respect to range with sufficient resolution for different sets of frequencies/wavelengths from different portions of the electromagnetic spectrum. These different sets of frequencies/wavelengths interact differently within a snowpack to provide different types of information about the snowpack. In other words, the invention is practiced multiple times across different spans of frequency to acquire more information from the different responses of the snowpack to different wavelengths. As a result, for example, information about the response of a snowpack to different spans of frequencies/wavelengths in C-band, X-band, and/or any of the K-bands, or different portions of these bands, can be acquired and compared. Information from frequency bands not listed may also be acquired.

In certain embodiments, a range of frequencies pertaining to a bandwidth over which the frequencies are modulated may be stitched together from multiple, non-continuous blocks of frequencies to discriminate and resolve reflections with respect to range for a single span of the electromagnetic spectrum. Stitching together frequencies from non-continuous blocks of frequencies is different than acquiring information from different spans of the electromagnetic spectrum as discussed in the preceding paragraph, where sufficient bandwidth is achieved at different spans of the spectrum to discriminate and resolve reflections with respect to range at different from different spans of the electromagnetic spectrum. Frequency modulation may be continuous, or performed in discrete steps. Where frequency modulation is performed in discrete steps, the Nyquist rate should be observed to avoid aliasing.

To allow return values to be calculated for complete volumes defined in three dimensions, the method 1500 involves translating 1508 an antenna system to occupy different positions with respect two axes substantially orthogonal to the direction of propagation and to each other. Reflections from the snowpack result in storing 1510 data about electromagnetic reflections indexed to positions of the antenna system. These reflections are received by the antenna system, which may be attached to a signal conditioning module 600 similar to the one depicted in FIG. 6. In certain embodiments, storing 1510 data about electromagnetic reflections may also involve de-chirping as discussed with respect to the dechirp module 650 discussed with reference to FIG. 6. The storing of data may or may not be facilitated by a storage module 650 similar to the one discussed with respect to FIG. 6. In certain embodiments, data is stored by indexing reflection returns to frequencies and antenna system positions.

After the storing 1510 of data, a determination 1512 is made as to whether a scan is complete. A scan is complete when the antenna has been translated sufficiently with respect to both axes over an area to create a synthetic aperture, as discussed with respect to FIG. 7. If the answer to the determination 1512 is no, the method 1500 returns to modulating 1506 the transmit frequency.

At each position occupied by the antenna system during the creation of the synthetic aperture, the frequency of the transmit signal needs to be substantially modulated over the entire bandwidth needed to discriminate reflections with respect to range with sufficient resolution for a particular set of frequencies. Where the invention involves the acquisition of information from multiple sets of frequencies, the sets of frequencies may be traversed during a single scan or multiple scans. Where the antenna system is translated continuously, and not incrementally, the frequencies may not all be transmitted 1504 and received 1510 from the same position, but discrepancies can be accounted for during processing 1514.

After modulating 1504 the frequency again, the antenna system is again translated. The antenna system is translated in a path, whether linear, diagonal, curved, circular, or any other trajectory to occupy different positions with respect to the two axes. The two axes should be substantially orthogonal to one another and to the direction of propagation. In some embodiments, the different positions may also differ from one another with respect to the direction-of-propagation axis, as when a synthetic aperture is formed in accordance with the geometric spotlight method for creating a synthetic aperture. Additionally, the line of sight of the antenna system may be rotated at individual positions in accordance with the steered spotlight method for creating a synthetic aperture.

The scan is complete when the synthetic aperture is of sufficient dimensions to acquire the requisite range resolution pursuant to the equation in FIG. 7*b* and when a sufficient spatial sampling frequency is achieved. At this point, processing 1514 is performed on the reflection data to determine reflection values for different volumes within the snowpack. A discussion of different approaches to processing 1514 reflection data follows the discussion of FIG. 7. After processing 1514 the data, the method 1500 comes to an end 1516.

Figure 16:
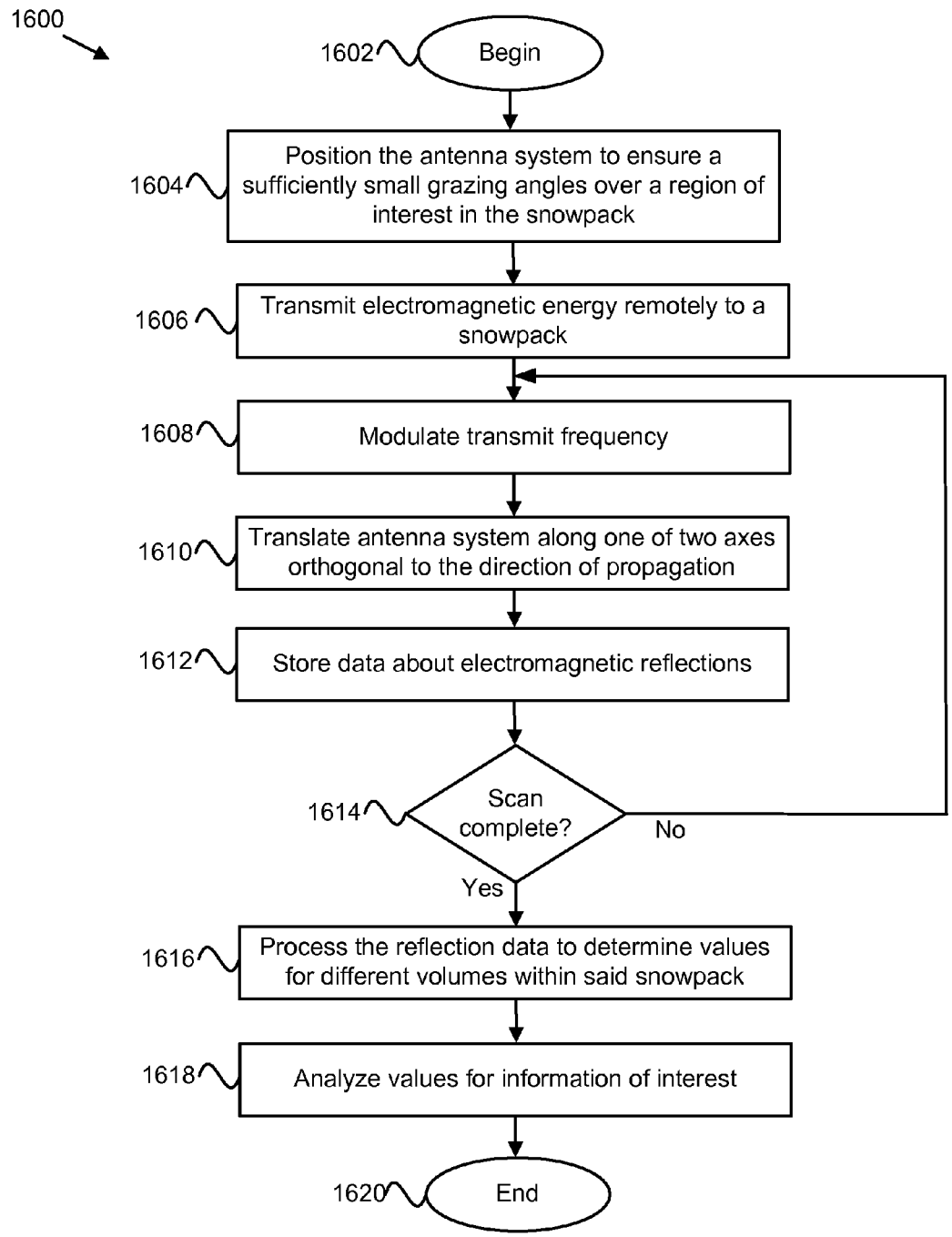
FIG. 16 is a flow chart illustrating one embodiment of a method to remotely acquire information from volumes in a snowpack by maximizing the ratio of returns from within the snowpack to returns from the ground underneath in accordance with the present invention.

FIG. 16 is a flow chart illustrating one embodiment of a method 1600 to remotely acquire information from volumes in a snowpack by maximizing the ratio of returns from within the snowpack to returns from the ground underneath. The method includes steps of: transmitting 1606 electromagnetic energy remotely to a snowpack; modulating 1608 a transmit frequency; translating 1610 an antenna system; storing 1612 data about electromagnetic reflections; determining 1614 the completeness of a scan; and processing 1616 data that are substantially similar respectively to step 1504, step 1506, step 1508, step 1510, determination 1512, and step 1514 as discussed in reference to FIG. 15. The method 1600 discussed with reference to FIG. 16 includes the additional steps of positioning 1604 the antenna system to ensure sufficiently small grazing angles over a region of interest in the snowpack and analyzing 1618 reflection values for information of interest.

The method 1600 begins 1602 and the position 1604 of the antenna system is oriented to ensure small grazing angles. Small grazing angles are achieved where the direction of propagation of transmitted electromagnetic energy at a remotely disposed region of interest describes a shallow angle relative to the plane of the snowpack with its constitutive layers. One example of this situation is depicted in FIG. 4. At sufficiently small grazing angles, reflections from the snowpack are not overcome by reflections from the ground, as explained with reference to FIG. 10a and FIG. 10b.

Before the method 1600 comes to an end 1620, a step of analyzing 1618 reflection values for information of interest is involved. The step of analyzing 1618 may be as simple as determining the volume of snow in the snowpack by determining which volumes have sufficient reflection values to indicate the presence of snow. In more complicated embodiments, analyzing 1618 reflection values may involve looking for relatively strong or weak (depending on the set of frequencies transmitted) return values to determine the location of an avalanche victim. The strength of return values may also be used to determine densities and/or water content and to determine the presence of avalanche debris. In some embodiments, reflection values may be aggregated into an image that is reviewed to determine snowpack properties.

The properties discussed above do not limit the properties for which reflection returns may be analyzed 1618. As examples of some of the additional properties for which returns may be analyzed, reflection returns may be analyzed 1618 for properties important to snowpack stratigraphy, some of which may be important to avalanche prediction. Analysis for such properties may proceed according to the method 1700 discussed with respect to FIG. 17.

Figure 17:
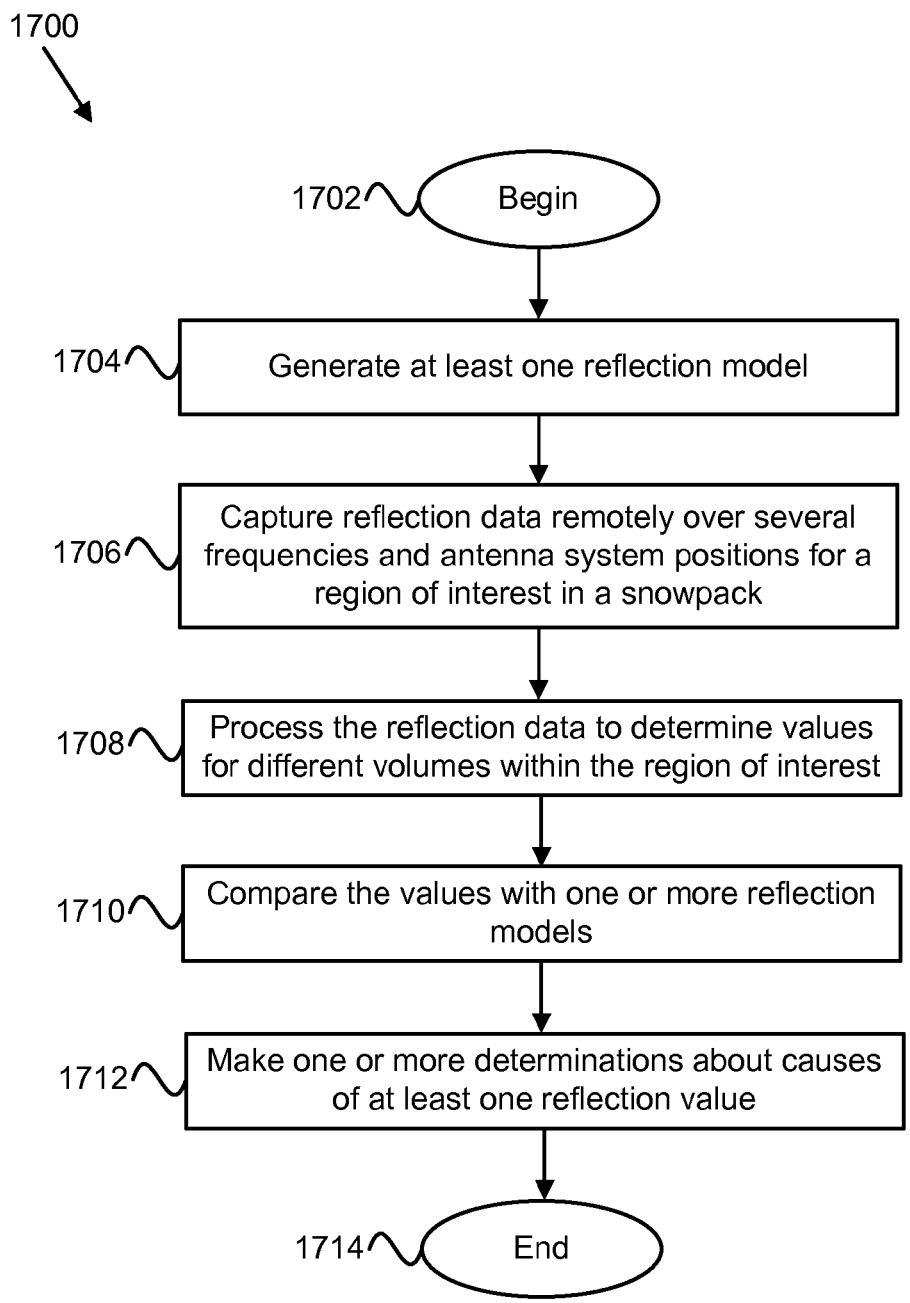
FIG. 17 is a flow chart illustrating one embodiment of a method to remotely acquire and analyze information from volumes in a snowpack in accordance with the present invention.

FIG. 17 is a flow chart illustrating one embodiment of a method 1700 to remotely acquire and analyze information from volumes in a snowpack. The method 1700 begins 1702 by generating 1704 at least one reflection model. A reflection model provides an expected reflection value for a particular volume that might be found in a snowpack for at least one frequency. A reflection model is similar to a volume scattering coefficient, but provides reflection values for predetermined volumes. In certain embodiments, volume scattering coefficients can be relied upon in the analysis process.

The subject of reflection volumes can vary widely from snow generally to the body of an avalanche victim, whether frozen or warm. A reflection model can model expected returns for high density avalanche debris, low-density, "powder" snow, snow of various water contents and distributions, and different layers important to avalanche formation. Such layers may include, without restriction, layers with rounded grains 1102 (see FIG. 11) faceted grains 1202, depth hoar 1206, buried surface hoar 1208 (see FIG. 12), crusts, and wind deposited snow. Reflection models may be created for different sizes and/or shapes of ice grains generally or for different sizes and/or shapes within the categories enumerated above. Different reflection models within these categories may also be generated based on additional properties not enumerated.

Reflection models may be generated by empirical methods and/or by computer modeling. Empirical models may be generated from returns from several samples of a particular type of snow, or other subject of interest, with calculated variances and standard deviations. In certain embodiments only a single sample may be used.

Computer models may be generated from three-dimensional volume models of the different electromagnetic properties associated with the subject of interest. For example, three-dimensional volume maps of snow structures may be generated based on the typical sizes, shapes, and distributions of ice grains pertaining to a layer of interest in a snowpack. The three-dimensional models may include water distributions. More sophisticated volume maps of microstructure may be generated from x-ray diffraction of actual samples of snow types.

Volume maps can then be imported into electromagnetic computational software. A wide variety of software packages (both proprietary and open source) are available based on the Finite Difference Time Domain (FDTD), Method of Moments (MOM), and Finite Element Method (FEM), algorithms, among others. The particular software package selected should be tailored to the particular model and selected by those of ordinary skill in the art. High Frequency Structural Simulator (HFSS), based on the FEM algorithm, is an example of such software packages that can be used in certain embodiments.

In certain embodiments, reflection models are calculated for several different sets of frequencies. Reflection models for reflection values at several different sets of frequencies can be used to generate an expected plot for a volume similar to the plot 1302 for the imagined ice grain discussed with reference to FIG. 13. Such an expected volume plot for different sizes in the Rayleigh regime 1308 and sizes and shapes in the Mie regime can be compared against actual returns at the actual sets of frequencies transmitted.

The method 1700 continues by capturing 1706 reflection data remotely over several frequencies and antenna system positions for a region of interest in a snowpack. Additionally, the method 1700 involves processing 1708 the reflection data to determine values for different volumes within the region of interest. The steps of capturing 1706 reflection data and of processing 1708 the reflection data may be performed by methods substantially similar to those discussed with reference to FIG. 14, FIG. 15, and FIG. 16.

Once the reflection values are determined for various volumes, they are compared 1710 with one or more reflection models. Determinations 1712 are then made as to whether reflection values resemble a particular reflection model or which model the actual reflection values most resemble, whether at a single set of frequencies or over multiple sets of frequencies. The determination 1712 may be based on modern theories of estimation and detection. Once the determinations 1712 have been made, the method 1700 ends 1714.

The invention claimed is:

1. A method for remotely acquiring information from volumes in a snowpack comprising:
   transmitting electromagnetic energy to a snowpack from a remote location at a shallow grazing angle;
   receiving electromagnetic reflections from said snowpack; and
   processing data about said electromagnetic reflections with an electronic computer processor to determine reflection values for different volumes within said snowpack.

2. The method of claim 1, further comprising:
   modulating a frequency of said transmitted electromagnetic energy over a sufficient bandwidth to resolve distinct volumes within said snowpack with respect to a first axis;
   translating an antenna system transmitting said transmitted electromagnetic energy and receiving said electromagnetic reflections to occupy different positions with respect to a second axis substantially orthogonal to said first axis over a first distance sufficient to resolve different volumes within said snowpack with respect to said second axis; and
   translating said antenna system to occupy different positions with respect to a third axis, substantially orthogonal to said first axis and said second axis over a second distance sufficient to resolve different volumes within said snowpack with respect to said third axis, wherein said positions cover an area of dimensions defined by said first distance and said second distance.

3. The method of claim 2, further comprising positioning said antenna system to maintain a relative orientation to a region of interest within said snowpack that ensures that electromagnetic energy incident upon said region of interest arrives at a grazing angle sufficiently shallow to maximize returns from volume scattering in volumes of said snowpack compared to reflections from a boundary between said snowpack and ground underneath.

4. The method of claim 2, further comprising:
transmitting electromagnetic energy from at least one additional span of the electromagnetic spectrum capable of producing a different response from said snowpack over a sufficient bandwidth to resolve distinct volumes within said snowpack with respect to said first axis; and
processing data about said different response to determine reflection values for different volumes within said snowpack.

5. The method of claim 2, wherein said reflection values are compared against expected reflection values from a reflection model for a volume comprised of a particular subject of interest.

6. The method of claim 5, wherein said reflection model takes into account a density for said volume.

7. The method of claim 5, wherein said reflection model takes into account a general shape for an average ice grain in said volume.

8. The method of claim 5, wherein said reflection model takes into account a general size for an average ice grain in said volume.

9. The method of claim 5, wherein said reflection model provides an expected response profile as a function of wavelength.

10. The method of claim 5, wherein said reflection model takes into account a water content distribution.

11. The method of claim 2, further comprising:
transmitting electromagnetic energy to a region of interest of said snowpack wherein a victim of an avalanche may be buried; and
analyzing said reflection values to determine a location for said victim.

12. The method of claim 2, further comprising:
transmitting electromagnetic energy to a region of interest of said snowpack with a potential for including avalanche debris; and
analyzing said reflection values to determine a three-dimensional distribution for said avalanche debris.

13. The method of claim 2, further comprising:
transmitting electromagnetic energy to a region of interest of said snowpack important to determining snow-water equivalencies for a watershed; and
analyzing said reflection values to determine snow-water equivalencies.

14. The method of claim 2, further comprising:
transmitting electromagnetic energy to a region of interest of said snowpack from which avalanche formation may occur; and
analyzing said reflection values for properties relevant to avalanche prediction.

15. The method of claim 14, wherein said bandwidth, and said first distance and said second distance with respect to said second and said third axes are sufficient to achieve a resolution commensurate with a thickness for a layer of interest to avalanche prediction in said snowpack regardless of a direction of propagation relative to said snowpack.

16. An apparatus for remotely acquiring information from a snowpack comprising:

a signal conditioning module modulating electromagnetic energy across various frequencies within at least one bandwidth sufficiently large to resolve different volumes within said snowpack with respect to a first axis, defined by a direction of propagation directed along a shallow grazing angle relative to the snowpack, and with sufficient power to transmit said electromagnetic energy to a remote area of interest in a snowpack and to produce detectible reflections;
an antenna system electrically coupled to said signal conditioning module, wherein said antenna system transmits said electromagnetic energy, to arrive at a shallow grazing angle relative to the snowpack, and receives said reflections from said snowpack;
a memory coupled to said signal conditioning module, wherein said memory stores data about values for said reflections generated by said signal conditioning module; and
a processor communicatively coupled to said memory, wherein said processor determines reflection values for different volumes within said snowpack.

17. The apparatus of claim 16, further comprising infrastructure for translating said antenna system substantially orthogonal to said first axis, wherein said infrastructure translates said antenna system to occupy different positions with respect to a second axis and with respect to a third axis substantially orthogonal to said first axis and substantially orthogonal to one another over an area sufficient to resolve different volumes within said snowpack.

18. The apparatus of claim 16, wherein an orientation of said antenna system relative to said snowpack is maintained to ensure that electromagnetic energy incident upon said region of interest of said snowpack arrives at a grazing angle sufficiently shallow to maximize returns from volume scattering in volumes of said snowpack compared to reflections from a boundary between said snowpack and ground underneath.

19. A system for remotely retrieving information from a snowpack comprising:
a signal conditioning module modulating electromagnetic energy across various frequencies within at least one bandwidth sufficiently large to resolve different volumes within said snowpack with respect to a first axis, defined by a direction of propagation directed along a shallow grazing angle relative to the snowpack, and with sufficient power to transmit said electromagnetic energy to a remote area of interest in a snowpack and to produce detectible reflections;
an antenna system electrically coupled to said signal conditioning module transmitting said electromagnetic energy, to arrive at the shallow grazing angle relative to the snowpack, and receiving said reflections from said snowpack;
infrastructure for translating said antenna system substantially orthogonal to said first axis, wherein said infrastructure translates said antenna system to occupy different positions with respect to a second axis and with respect to a third axis substantially orthogonal to said first axis and substantially orthogonal to one another over an area sufficient to resolve different volumes within said snowpack, and wherein said infrastructure maintains an orientation of said antenna system relative to said area of interest to ensure that electromagnetic energy incident upon said snowpack arrives at a grazing angle sufficiently shallow to maximize returns from volume scattering in volumes of said snowpack compared to reflections from a boundary between said snowpack and ground underneath;

a memory coupled to said signal conditioning module storing reflection data indexed to reflection frequencies and positions of said antenna system at which reflections are received; and a processor communicatively coupled to said memory determining reflection values for different volumes within said snowpack.

20. The system of claim 19, wherein:

said memory also stores at least one volume scattering coefficient that provides an expected reflection value for a particular volume that potentially exists in the snowpack; and said processor compares the at least one volume scattering coefficient to the reflection data to determine the presence of the particular volume in the snowpack.

* * * * *